(12) United States Patent
Matsushima et al.

(10) Patent No.: US 12,022,049 B2
(45) Date of Patent: Jun. 25, 2024

(54) COLOR ADJUSTMENT SYSTEM, COLOR ADJUSTMENT METHOD, AND COLOR ADJUSTMENT APPARATUS

(71) Applicants: Hiroyuki Matsushima, Kanagawa (JP); Hitomi Hanyu, Kanagawa (JP); Kyoko Saito, Kanagawa (JP)

(72) Inventors: Hiroyuki Matsushima, Kanagawa (JP); Hitomi Hanyu, Kanagawa (JP); Kyoko Saito, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/113,091

(22) Filed: Feb. 23, 2023

(65) Prior Publication Data

US 2023/0300278 A1 Sep. 21, 2023

(30) Foreign Application Priority Data

Feb. 28, 2022 (JP) .................................. 2022-030451
Jan. 4, 2023 (JP) .................................. 2023-000250

(51) Int. Cl.
*H04N 1/00* (2006.01)
*H04N 1/50* (2006.01)
*H04N 1/60* (2006.01)

(52) U.S. Cl.
CPC ....... *H04N 1/6033* (2013.01); *H04N 1/00244* (2013.01); *H04N 1/00347* (2013.01); *H04N 1/0048* (2013.01); *H04N 1/00482* (2013.01); *H04N 1/00811* (2013.01); *H04N 1/50* (2013.01)

(58) Field of Classification Search
None
See application file for complete search history.

(56) References Cited

U.S. PATENT DOCUMENTS

| | | | |
|---|---|---|---|
| 2013/0027759 A1* | 1/2013 | Nakamura | H04N 1/6055 358/505 |
| 2013/0242339 A1* | 9/2013 | Jung | G06F 3/1212 358/1.15 |
| 2016/0006796 A1 | 1/2016 | Matsushima et al. | |
| 2016/0125174 A1 | 5/2016 | Matsushima | |
| 2016/0261773 A1* | 9/2016 | Tsuji | H04N 1/00023 |
| 2016/0261775 A1* | 9/2016 | Jung | H04N 1/6033 |
| 2017/0269917 A1* | 9/2017 | Matsushima | H04N 1/4433 |

(Continued)

FOREIGN PATENT DOCUMENTS

| | | |
|---|---|---|
| EP | 3 557 857 A1 | 10/2019 |
| JP | 2013-030996 | 2/2013 |
| JP | 2022-027294 | 2/2022 |

OTHER PUBLICATIONS

Extended European Search Report dated Jul. 11, 2023 in European Patent Application No. 23158187.7, 9 pages.

*Primary Examiner* — Henok Shiferaw
(74) *Attorney, Agent, or Firm* — XSENSUS LLP

(57) ABSTRACT

A color adjustment system includes circuitry to register job data for requesting printing a document file in a memory, register color sample data associated with the job data in the memory, cause a printing apparatus to print out the document file corresponding to the job data as a first printed matter, cause a reading apparatus to read the first printed matter to acquire first read image data, and generate an input profile based on the first read image data and the color sample data.

16 Claims, 24 Drawing Sheets

(56) References Cited

U.S. PATENT DOCUMENTS

| | | | |
|---|---|---|---|
| 2018/0131840 A1* | 5/2018 | Honma | H04N 1/6041 |
| 2019/0260911 A1* | 8/2019 | Toriyabe | G06T 11/001 |
| 2019/0297226 A1* | 9/2019 | Ohkubo | H04N 1/60 |
| 2019/0303544 A1 | 10/2019 | Matsushima | |
| 2020/0213477 A1* | 7/2020 | Hirano | G06K 15/188 |
| 2021/0072931 A1 | 3/2021 | Matsushima et al. | |
| 2021/0383572 A1* | 12/2021 | Haba | G06T 7/90 |
| 2022/0006921 A1* | 1/2022 | Tsukano | H04N 1/6025 |
| 2022/0036570 A1 | 2/2022 | Aizaki | |
| 2022/0236934 A1 | 7/2022 | Matsushima | |
| 2022/0300218 A1 | 9/2022 | Matsushima | |
| 2023/0141186 A1* | 5/2023 | Koda | G06F 3/128 |
| | | | 358/1.15 |
| 2023/0144579 A1* | 5/2023 | Koda | H04N 1/00816 |
| | | | 358/1.9 |

* cited by examiner

FIG. 9

JOB LIST SCREEN

1001 — JOB REGISTRATION

1002

| JOB | Date | State | Color Method |
|---|---|---|---|
| JOB A | 11.22.2021 | New Job | New Job |
| JOB B | 11.22.2021 | New Job | Digital Master from Read Original |
| JOB C | 11.22.2021 | New Job | New Job |
| JOB D | 11.22.2021 | New Job | New Job |
| JOB E | 11.22.2021 | New Job | New Job |

FIG. 10

JOB REGISTRATION SCREEN — 1100

Print Job Name — 1101

Document File — 1102
Select File

Copies — 1103

Sheet Type

Color Settings

Input Profile

1104 — ○ ISO Standard — 1105

1106 — ◉ Create Digital Color Proof

ΔE Target — 1107

Due Date — 1108
June 10, 2021

CANCEL — 1112

NEXT — 1111

FIG. 13

| Digital Color Proof Name | 1401 |
| Color Target Rule Name | 1402 |

1412 CANCEL   1411 CREATION

FIG. 14

JOB SELECTION SCREEN    1502 JOB REGISTRATION

1501

| JOB | Date | State | Color Method | Customer |
|---|---|---|---|---|
| JOB A | 11.22.2021 | New Job | Digital Master from PDF Original | AAA |
| JOB B | 11.22.2021 | New Job | Digital Master from Read Original | BBB |
| JOB F | 11.22.2021 | New Job | ISO Standard | FFF |
| JOB E | 11.22.2021 | New Job | ISO Standard | EEE |
| JOB G | 11.22.2021 | New Job | ISO Standard | GGG |
| JOB H | 11.22.2021 | New Job | ISO Standard | HHH |

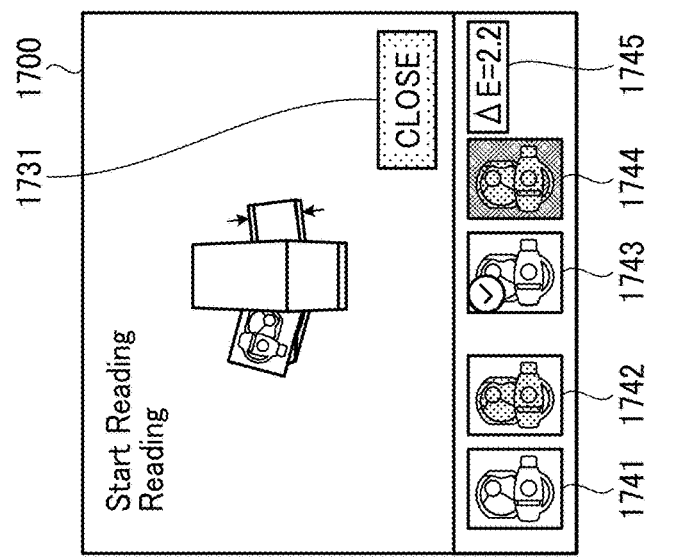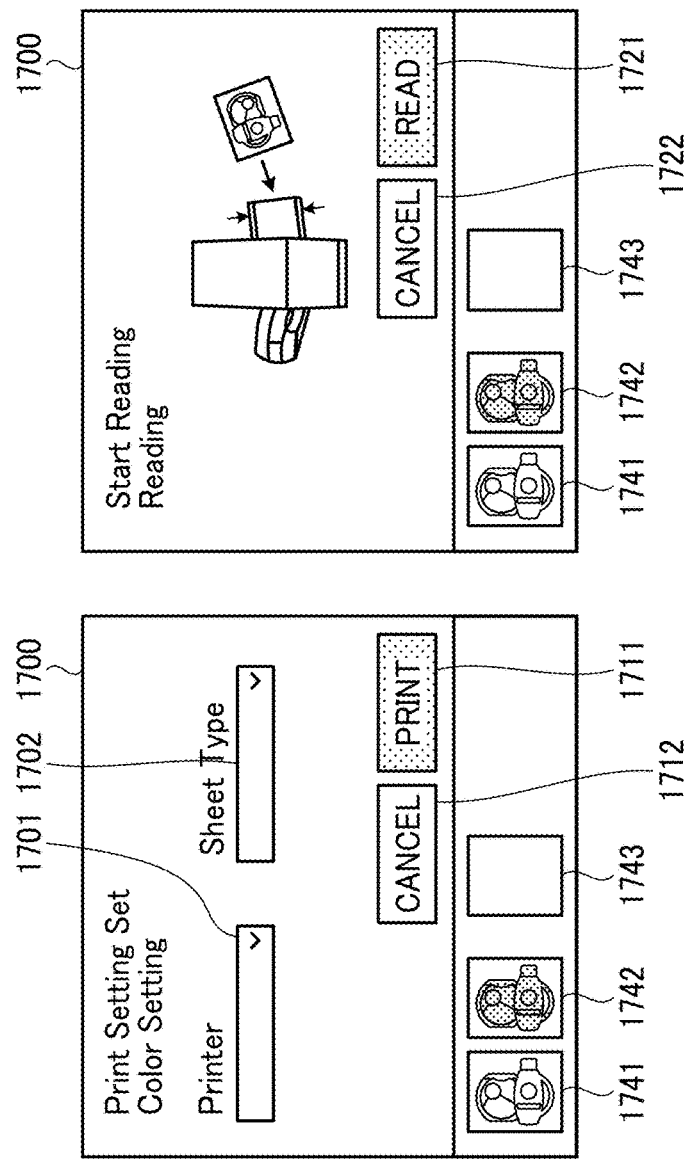

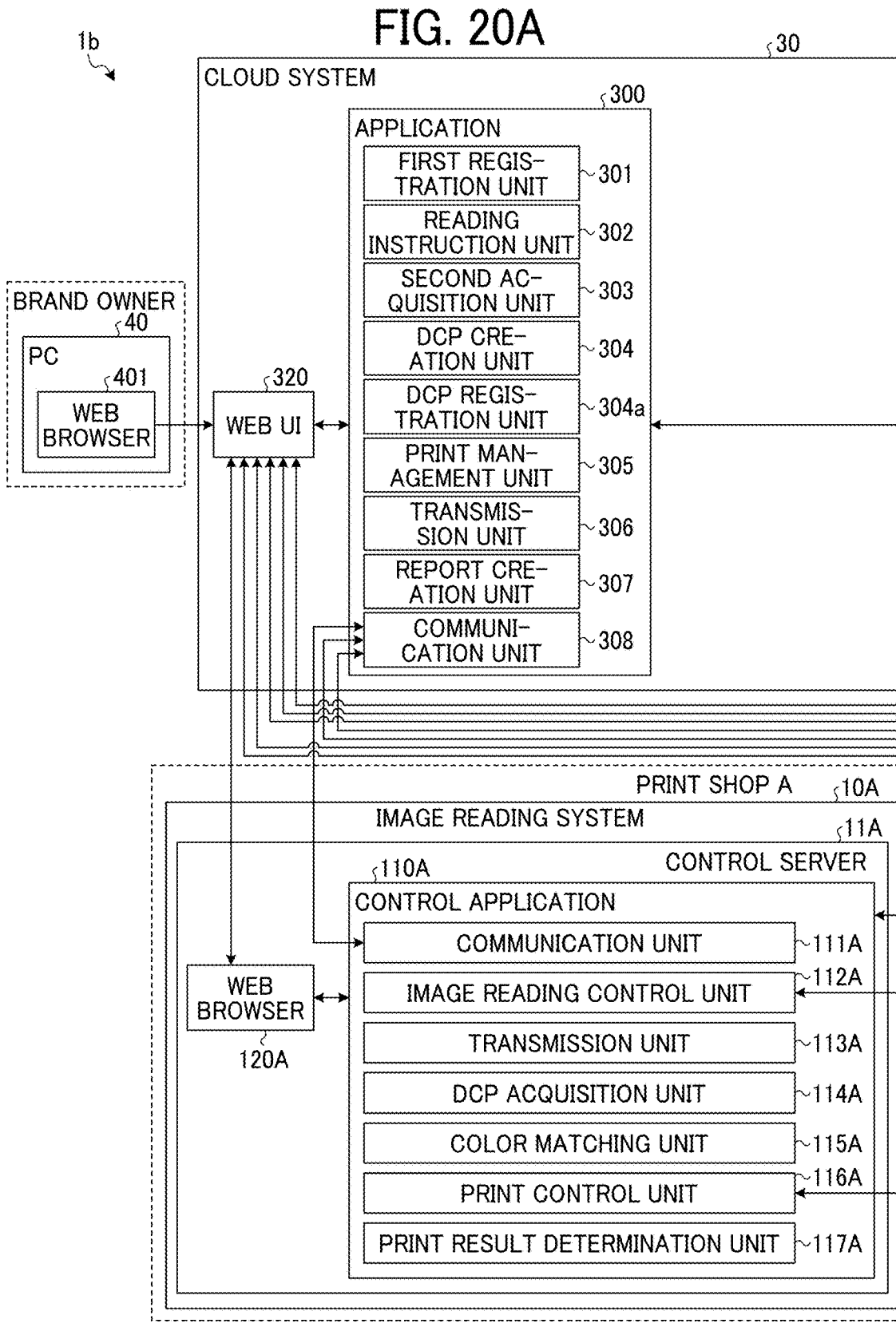

FIG. 24

JOB DUPLICATION SCREEN

Print Job Name 2201
[JOB F2]

Document File 2202
[JOB F File]

Copies 2203
[    ]

Sheet Type
[Sheet123 ▼]

Color Settings

Input Profile
2204 — ◉ ISO Standard    [▼] 2205
2206 — ○ Create Digital Color Proof ΔE Target 2207
[2.2]

Due Date 2208
[📅 June 10, 2021 ▼]

2212 [CANCEL]    2211 [NEXT]

COLOR ADJUSTMENT SYSTEM, COLOR ADJUSTMENT METHOD, AND COLOR ADJUSTMENT APPARATUS

CROSS-REFERENCE TO RELATED APPLICATIONS

This patent application is based on and claims priority pursuant to 35 U.S.C. § 119(a) to Japanese Patent Application Nos. 2022-030451, filed on Feb. 28, 2022, and 2023-000250, filed on Jan. 4, 2023, in the Japan Patent Office, the entire disclosure of which is hereby incorporated by reference herein.

BACKGROUND

Technical Field

The present disclosure relates to a color adjustment system, a color adjustment method, and a color adjustment apparatus.

Related Art

In the field of commercial printing (production printing), color adjustment is performed using color sample matching for printers (primarily electrophotographic printers and inkjet printers). Here, the color sample matching refers to processing of generating an input profile for a printer using color sample data serving as a sample representing ideal color and a read image of a printed matter printed before the color sample matching. The input profile facilitates color conversion to bring color of a printed matter to be printed closer to color represented by color sample.

As such a color adjustment technique, there is disclosed a technique of creating a color tone conversion parameter using reference image data obtained by an image reading apparatus reading a reference printed matter.

SUMMARY

In one aspect, a color adjustment system includes circuitry to register job data for requesting printing a document file in a memory, register color sample data associated with the job data in the memory, cause a printing apparatus to print out the document file corresponding to the job data as a first printed matter, cause a reading apparatus to read the first printed matter to acquire first read image data, and generate an input profile based on the first read image data and the color sample data.

In another aspect, a color adjustment method includes registering job data for requesting printing a document file in a memory, registering color sample data associated with the job data in the memory, causing a printing apparatus to print out the document file corresponding to the job data as a first printed matter, causing a reading apparatus to read the first printed matter to acquire first read image data, and generating an input profile based on the first read image data and the color sample data.

In another aspect, color adjustment apparatus includes circuitry to cause a printing apparatus to print out a document file corresponding job data registered in a memory as a first printed matter, cause a reading apparatus to read the first printed matter to acquire first read image data, and generate an input profile based on the first read image data and color sample data registered in the memory in association with the job data.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 9 is a diagram illustrating an example of a job list screen according to one embodiment of the present disclosure;

FIG. 10 is a diagram illustrating an example of a job registration screen according to one embodiment of the present disclosure:

FIG. 13 is a diagram illustrating an example of a color conversion rule designation screen according to one embodiment of the present disclosure:

FIG. 14 is a diagram illustrating an example of a job selection screen according to one embodiment of the present disclosure;

FIGS. 16A to 16C are diagrams illustrating an example of operations using a print result determination screen according to one embodiment of the present disclosure;

FIGS. 20A to 20C are block diagrams illustrating an example of a functional configuration of a color adjustment system according to a second modification of the embodiment of the present disclosure;

FIG. 24 is a diagram illustrating an example of a job duplication screen according to the second modification of the embodiment of the present disclosure.

Figure 1:
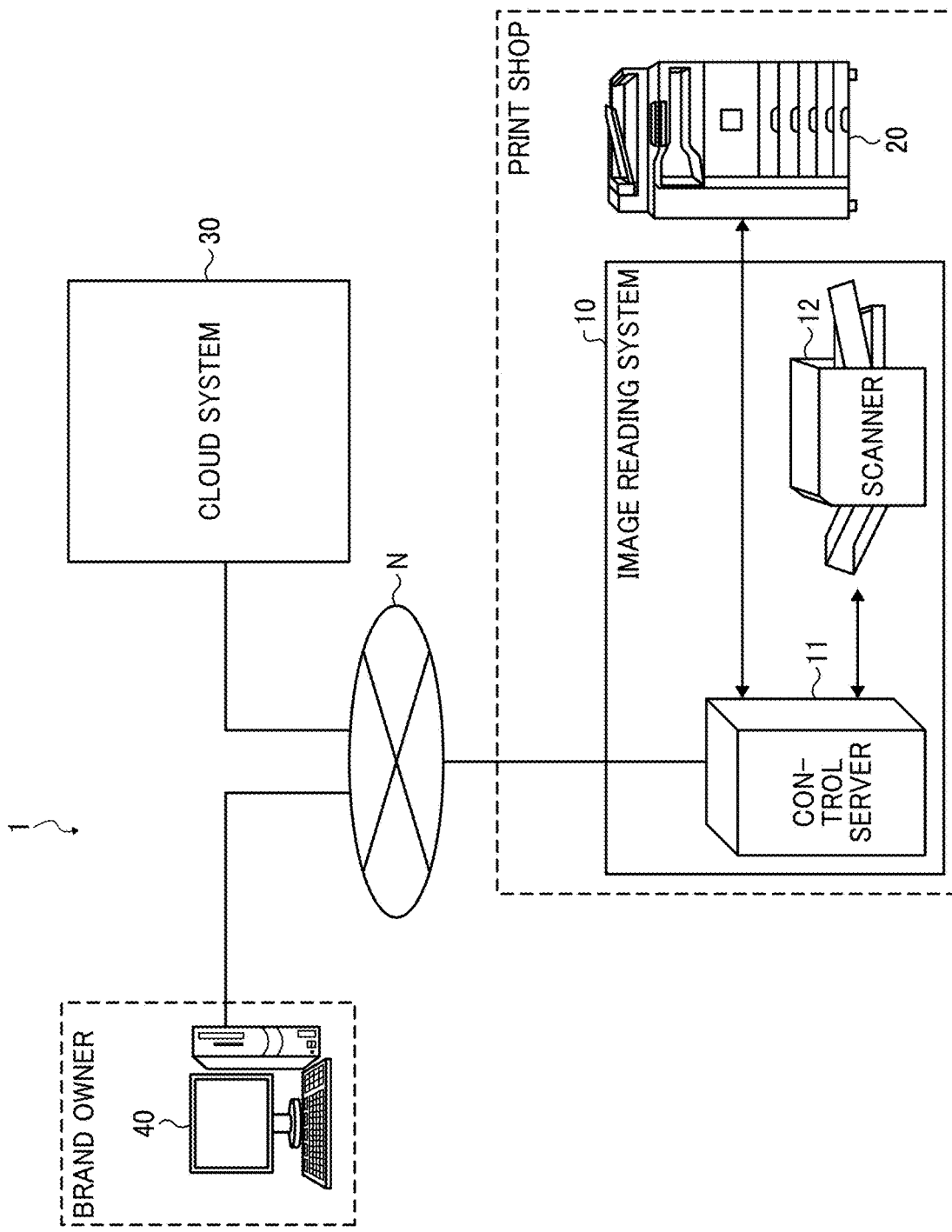
FIG. 1 is a schematic diagram illustrating an example of an overall configuration of a color adjustment system according to one embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, descriptions are given in detail of a color adjustment system, a color adjustment method, and the color adjustment apparatus according to one embodiment of the present disclosure with reference to the drawings. The present disclosure, however, is not limited to the following one or more embodiments, and the constituent elements of the following one or more embodiments include elements that may be easily conceived by those skilled in the art, those being substantially the same ones, and those being within equivalent ranges. Furthermore, various omissions, substitutions, changes, and combinations of the constituent elements may be made without departing from the gist of the following one or more embodiments.

Overall Configuration of Color Adjustment System

FIG. 1 is a schematic diagram illustrating an example of an overall configuration of a color adjustment system according to the present embodiment. A description is given of the overall configuration of a color adjustment system 1 according to the present embodiment with reference to FIG. 1.

The color adjustment system 1 illustrated in FIG. 1 is an information processing system for performing color adjustment for printing processing performed by a printer using a digital color proof (DCP) based on a print sample. The DCP is color sample data created based on a read image (read image data) obtained by reading a print sample that is a printed matter serving as a color sample representing ideal color. The print sample is a printed matter or the like obtained by an ideal printer printing a document file included in job data in advance. The ideal printer is, for example, a printer or offset printing machine that has already been adjusted to an appropriate state. As illustrated in FIG. 1, the color adjustment system 1 includes an image reading system 10 (reading system), a printer 20 (printing apparatus), a cloud system 30, and a personal computer (PC) 40. In the configuration of the color adjustment system 1 illustrated in FIG. 1, the image reading system 10, the cloud system 30, and the PC 40 are communicable with each other via a network N such as the Internet. The image reading system 10 and the printer 20 are communicable with each other via a network such as a local area network (LAN).

In this example, the image reading system 10 is held by a print shop holding the printer 20, but not limited thereto. In another example, the image reading system 10 may be held by a print management company or a calibration site that acts as an intermediary between the print shop and a brand owner who places an order of printing. In another example, the image reading system 10 may be held by the brand owner or another print shop other than the print shop illustrated in FIG. 1. In the present embodiment, as illustrated in FIG. 1, a description is given on the assumption that the image reading system 10 is held by the print shop serving as a particular print site. In another example, the image reading system 10 may be referred to as an image reading and printing system, an image processing system, a system on a printing company, or an on-premise system on the site. The brand owner is an example of a client or orderer who orders production of a product, such as printing a printed mater, to the printing company or the like. On the other hand, the printing company (print shop, print office) is a product supplier that has a print site where a printer is installed, receives an order from a client, prints a printed matter as a product, and delivers the printed matter to the client. The product supplier may receive the order directly from the client, or may receive the order indirectly through a print quality control company or an intermediary company such as a print management company or a calibration company. The printed matter primarily refers to a commercial printed matter used by a brand owner for business and sales promotion, such as an advertisement, a leaflet, a booklet, a poster, a direct mail, a promotional material, a catalog, a pamphlet, a slip, an invoice, and the like, but also refers to any other printed matter of a document. The present disclosure may be applied to any order and delivery process of production of not only printed matters but also various goods, merchandise, and promotional materials.

The image reading system 10 is a system for performing reading processing on a print sample. As illustrated in FIG. 1, the image reading system 10 includes a control server 11 and a scanner 12 (reading apparatus).

The control server 11 is a server apparatus that controls reading processing performed by the scanner 12. In addition to a dedicated server apparatus, the control server 11 may be implemented by a terminal apparatus, such as a PC installed with dedicated software and is held by the printing company or the print site. The scanner 12 is an apparatus for performing reading processing on a print sample and various kinds of printed matters under control of the control server 11. As the reading processing, the scanner 12 performs colorimetry on the print sample and the printed matters to obtain read images formed of device-independent color values such as L*a*b* values of the L*a*b* colorimetric system (hereinafter simply referred to as "Lab values"). Examples of the scanner 12 include, but are not limited to, apparatuses such as an image scanner and a colorimeter, and include any other apparatus having a function of acquiring the read images (read image data) of the print sample and the printed matters.

The printer 20 is a printer such as a multifunction peripheral (MFP) that performs printing processing for job data in accordance with a print instruction from the cloud system 30. Specifically, the printer 20 converts a document file included in the job data into device-independent color values (Lab values) using an input profile, converts the device-independent color values into CMYK data representing cyan (C), magenta (M), yellow (Y), and black (K) for the purpose of printing the document file in the color values using an output profile, and performs printing processing. As described later, the input profile is generated by a color matching unit 115 so that the input profile facilitates color conversion to bring color of a printed matter to be printed closer to the color represented by the DCP. On the other hands, the output profile is determined according to printing characteristics of the printer 20, and thus the output profile is assumed to be a fixed profile. Note that the printer 20 is not limited to the MFP, and may be any of printing apparatuses of various printing methods, such as an ordinary electrophotographic printing apparatus or inkjet printing apparatus having a printing function as a main function, or a commercial printing apparatus controlled by a digital front end (DFE).

The cloud system 30 is a system in a cloud service for creating a DCP based on the read image of the print sample and registering the DCP.

The PC 40 is an information processing apparatus held by the brand owner, and registers job data for which printing processing is requested. The job data is data for requesting a printing company to print a document file with predetermined settings.

Hardware Configuration of Printer

Figure 2:
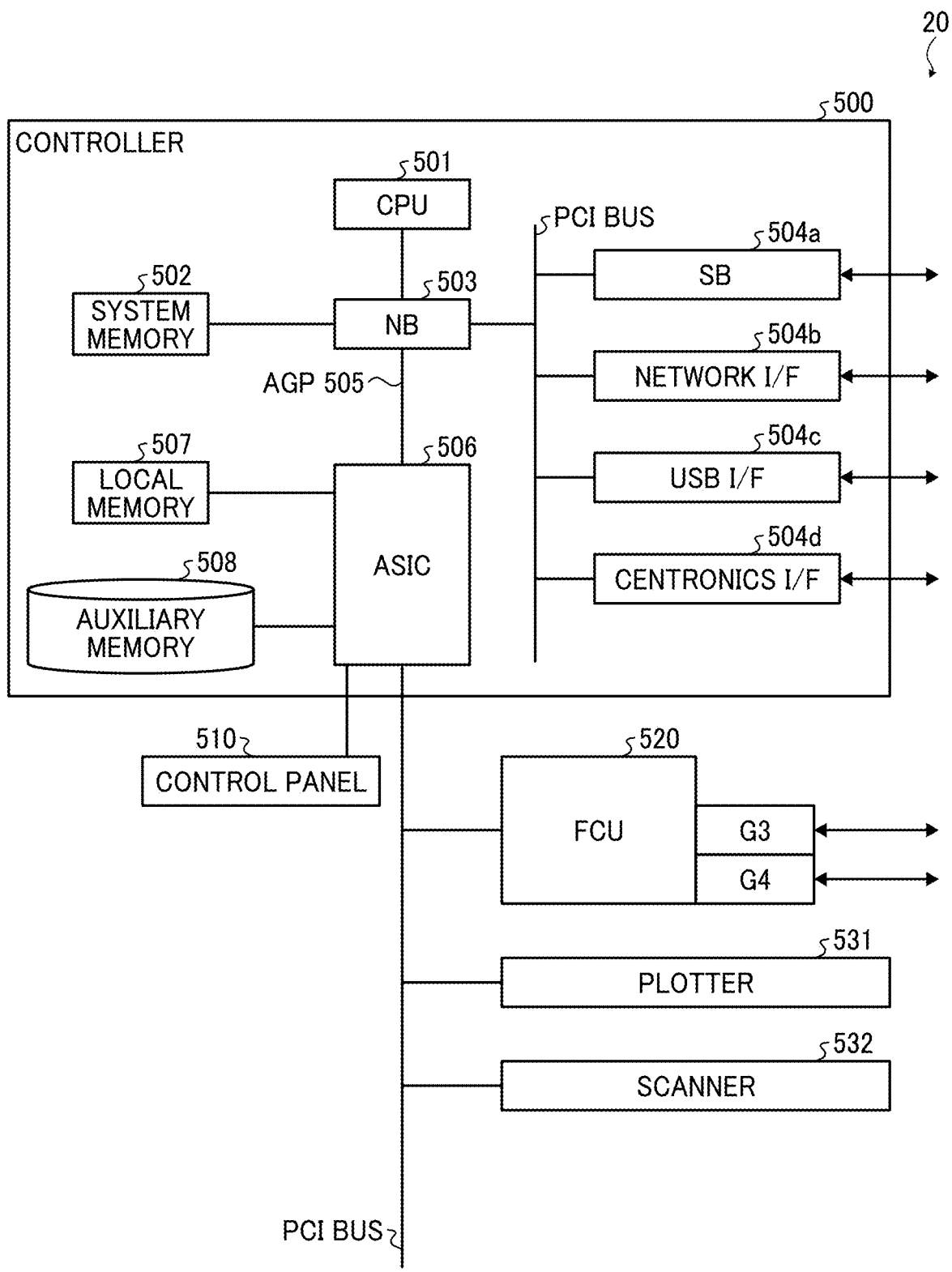
FIG. 2 is a block diagram illustrating an example of a hardware configuration of a printer according to one embodiment of the present disclosure.

FIG. 2 is a block diagram illustrating an example of a hardware configuration of a printer according to the present embodiment. A description is given below of the hardware configuration of the printer 20 according to the present embodiment with reference to FIG. 2.

As illustrated in FIG. 2, the printer 20 according to the present embodiment includes a controller 500, a control panel 510, a facsimile control unit (FCU) 520, a plotter 531 (printing device), and a scanner 532 that are connected to one another by a peripheral component interconnect (PCI) bus.

The controller 500 is a device that controls the entire operation, drawing, and communication performed by the printer 20 and controls input from the control panel 510.

The control panel 510 is, for example, a touch panel. The control panel 510 is a device that receives an input to the controller 500 (input function) and displays the status of the printer 20 (display function). The control panel 510 is directly connected to an application-specific integrated circuit (ASIC) 506 to be described later.

The FCU 520 is a device that provides a facsimile communication function, and is connected to the ASIC 506 via, for example, the PCI bus.

The plotter 531 is a device that provides a printing function, and is connected to the ASIC 506 via, for example, the PCI bus. The scanner 532 is a device that provides a scanning function, and is connected to the ASIC 506 via, for example, the PCI bus.

The controller 500 includes a central processing unit (CPU) 501, a system memory 502, a north bridge (NB) 503, a south bridge (SB) 504a, a network interface (I/F) 504b, a universal serial bus (USB) I/F 504c, a Centronics I/F 504d, the ASIC 506, a local memory 507, and an auxiliary memory 508.

The CPU 501 controls the entire operation of the printer 20. The CPU 501 is connected to a chipset including the system memory 502, the NB 503, and the SB 504a, and is connected to other devices via the chipset.

The system memory 502 is a memory for storing programs and data, loading programs and data, and loading drawing data. The system memory 502 includes a read only memory (ROM) and a random access memory (RAM). The ROM is a read only memory for storing programs and data. The RAM is a writable and readable memory for loading programs and data, and loading drawing data of the printer.

The NB 503 is a bridge for connecting the CPU 501 to the system memory 502, the SB 504a, and an accelerated graphics port (AGP) bus 505. The NB 503 includes a memory controller that controls reading from and writing to the system memory 502, a PCI master, and an AGP target.

The SB 504a is a bridge for connecting the NB 503 with PCI devices and peripheral devices. The SB 504a is connected to the NB 503 via the PCI bus. The network I/F 504b, the USB I/F 504c, and the Centronics I/F 504d are connected to the PCI bus.

The network/F 504b is an interface for communicating data with external apparatuses such as the control server 11 and the cloud system 30 using networks. The network I/F 504b supports, for example, ETHERNET and can establish communications in compliance with transmission control protocol (TCP)/internet protocol (IP).

The USB I/F 504c is an interface that can communicate with devices conforming to the USB standard.

The Centronics I/F 504d is an interface having a specification of a parallel port that can transmit a plurality of bits.

The AGP bus 505 is a bus interface for a graphics accelerator card to accelerate graphics processing. The AGP bus 505 can speed up the graphics accelerator card by directly accessing the system memory 502 with high throughput.

The ASIC 506 is an integrated circuit (IC) for image processing applications including hardware elements for image processing and has a role of a bridge connecting the AGP bus 505, the PCI bus, the auxiliary memory 508, and the local memory 507 one another. The ASIC 506 includes a PCI target, an AGP master, an arbiter (ARB) as a central processing unit of the ASIC 506, a memory controller for controlling the local memory 507, a plurality of direct memory access controllers (DMACs) capable of rotating image data with a hardware logic, and a PCI unit that transfers data between the plotter 531 and the scanner 532 via the PCI bus. For example, the FCU 520, the plotter 531, and the scanner 532 are connected to the ASIC 506 via the PCI bus. The ASIC 506 is also connected to a host PC and a network.

The local memory 507 is a memory used as a copy image buffer and a code buffer.

The auxiliary memory 508 is a storage area such as a hard disk drive (HDD), a solid state drive (SSD), a secure digital (SD) card, or a flash memory, and stores input profiles, output profiles, image data, programs, font data, and forms.

The program designed for the printer 20 may be recorded on a computer-readable recording medium, such as the auxiliary memory 508, for distribution in an installable or an executable file format.

The hardware configuration of the printer 20 illustrated in FIG. 2 is an example. The printer 20 does not necessarily include all the components illustrated in FIG. 2, or may include some other components.

Hardware Configuration of Information Processing Apparatus

Figure 3:
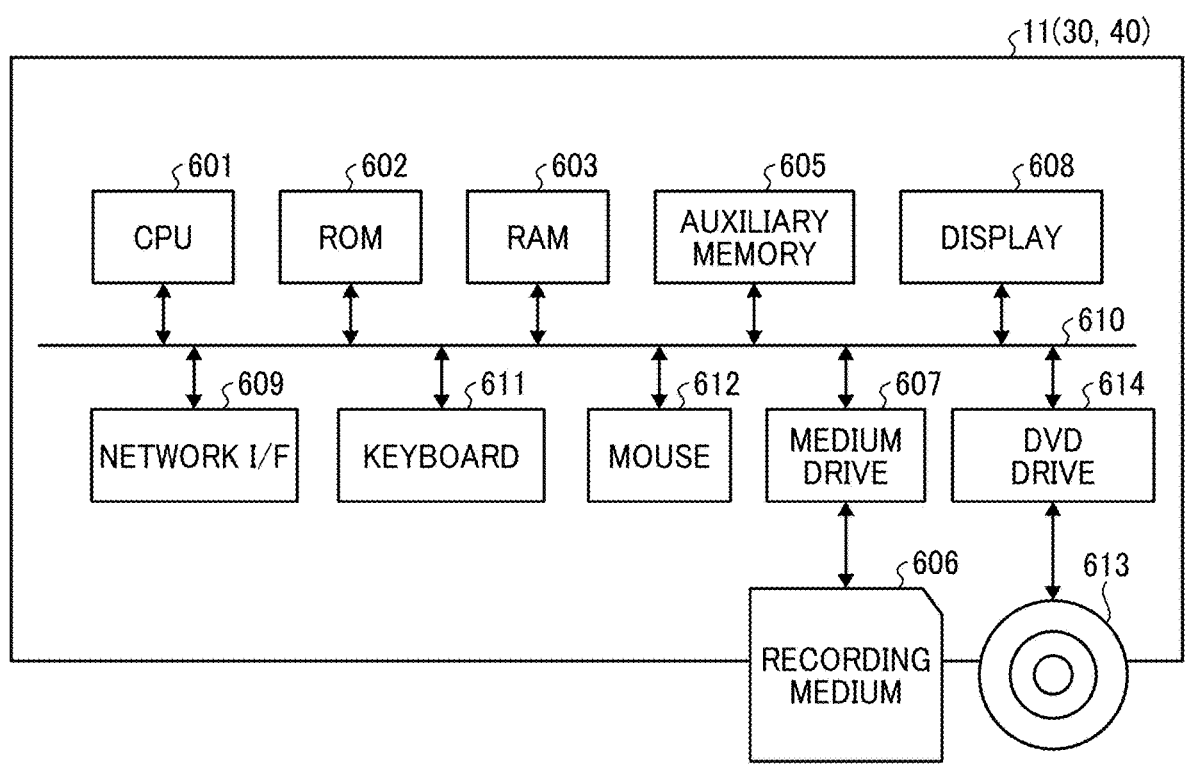
FIG. 3 is a block diagram illustrating an example of a hardware configuration of a control server or the like according to one embodiment of the present disclosure.

FIG. 3 is a block diagram illustrating an example of a hardware configuration of a control server or the like according to the present embodiment. A description is given below of the hardware configuration of the control server 11 according to the present embodiment with reference to FIG. 3.

As illustrated in FIG. 3, the control server 11 includes a CPU 601, a ROM 602, a RAM 603, an auxiliary memory 605, a medium drive 607, a display 608, a network I/F 609, a keyboard 611, a mouse 612, and a digital versatile disc (DVD) drive 614.

The CPU 601 is a processor that controls entire operation of the control server 11. The ROM 602 is a nonvolatile storage device that stores programs for the control server 11. The RAM 603 is a volatile storage device used as a work area for the CPU 601.

The auxiliary memory 605 is a storage device such as an HDD or an SSD that stores input profiles to be applied to the printer 20, various data, and programs. The medium drive 607 is a device that controls reading and writing of data to and from a recording medium 606 such as a flash memory under control of the CPU 601.

The display 608 is a display device including a liquid crystal or an organic electro-luminescence (EL) that displays various types of information such as a cursor, a menu, a window, characters, or an image.

The network I/F 609 is an interface for communicating data with external apparatuses such as the printer 20 and the cloud system 30 using networks. The network I/F 609 is, for example, a network interface card (NIC) that supports ETHERNET and that can establish communications in compliance with TCP/IP.

The keyboard 611 is an input device used for selecting characters, numbers, or various instructions, and for moving a cursor, for example. The mouse 612 is an input device used for selecting and executing various instructions, selecting an object subjected to processing, and moving a cursor, for example.

The DVD drive 614 is a device that controls reading and writing of various data from and to a DVD 613 that is an example of a removable storage medium such as a digital versatile disc read only memory (DVD-ROM) or a digital versatile disc recordable (DVD-R).

The CPU 601, the ROM 602, the RAM 603, the auxiliary memory 605, the medium drive 607, the display 608, the network I/F 609, the keyboard 611, the mouse 612, and the DVD drive 614 are communicably connected to one another via a bus line 610 such as an address bus or a data bus.

Note that the configuration of the control server 11 illustrated in FIG. 3 is an example. The control server 11 does not necessarily include all the components illustrated in FIG. 3, or may include some other components. For example, the control server 11 may include a USB I/F for performing data communication with the printer 20.

The hardware configurations of the cloud system 30 and the PC 40 also conform to the hardware configuration illustrated in FIG. 3. Further, the cloud system 30 is not limited to being configured by a single information processing apparatus, and may be configured by a plurality of information processing apparatuses.

Functional Configuration and Operation of Color Adjustment System

Figure 4:
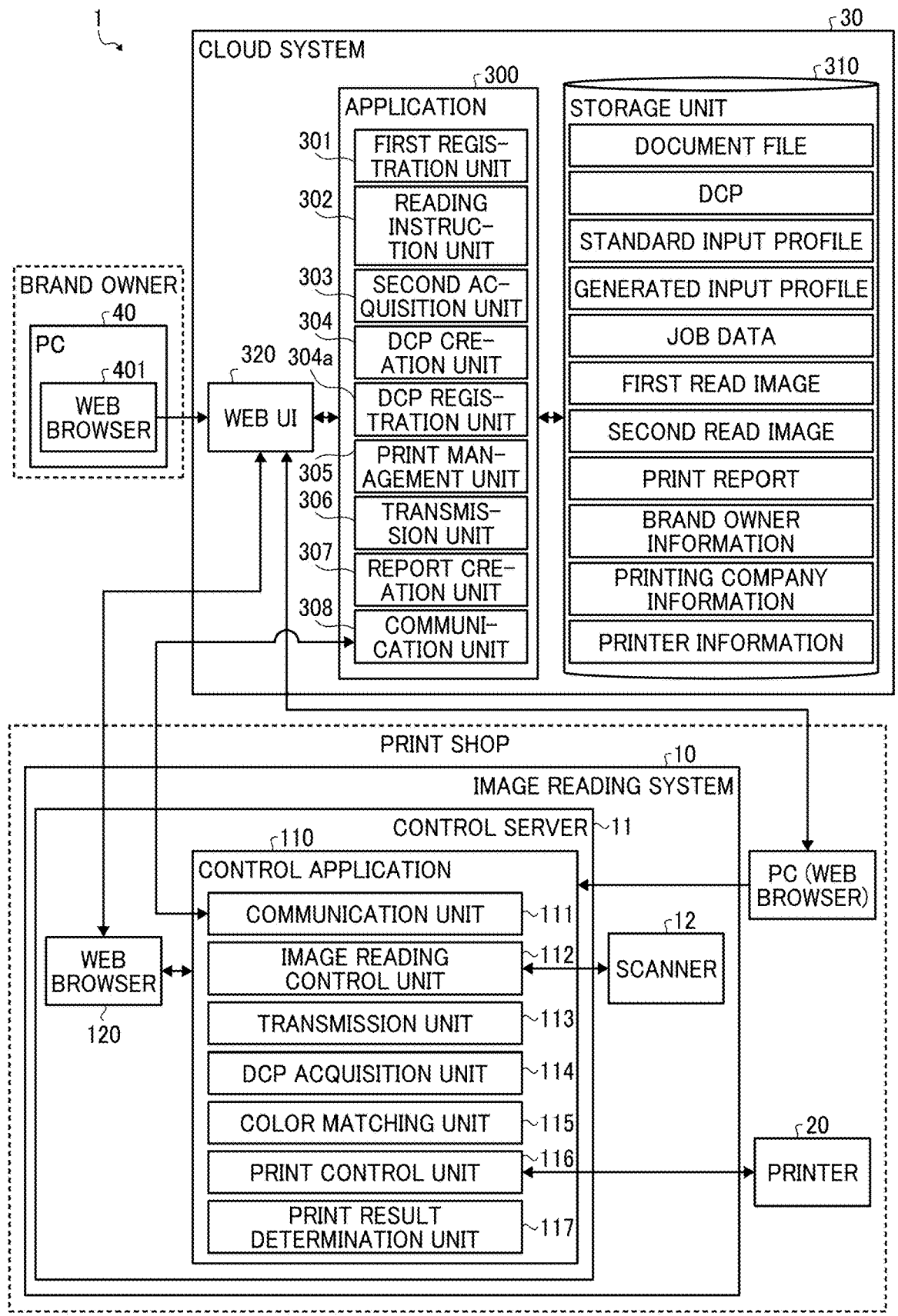
FIG. 4 is a block diagram illustrating an example of a functional configuration of the color adjustment system according to one embodiment of the present disclosure.
Figure 5:
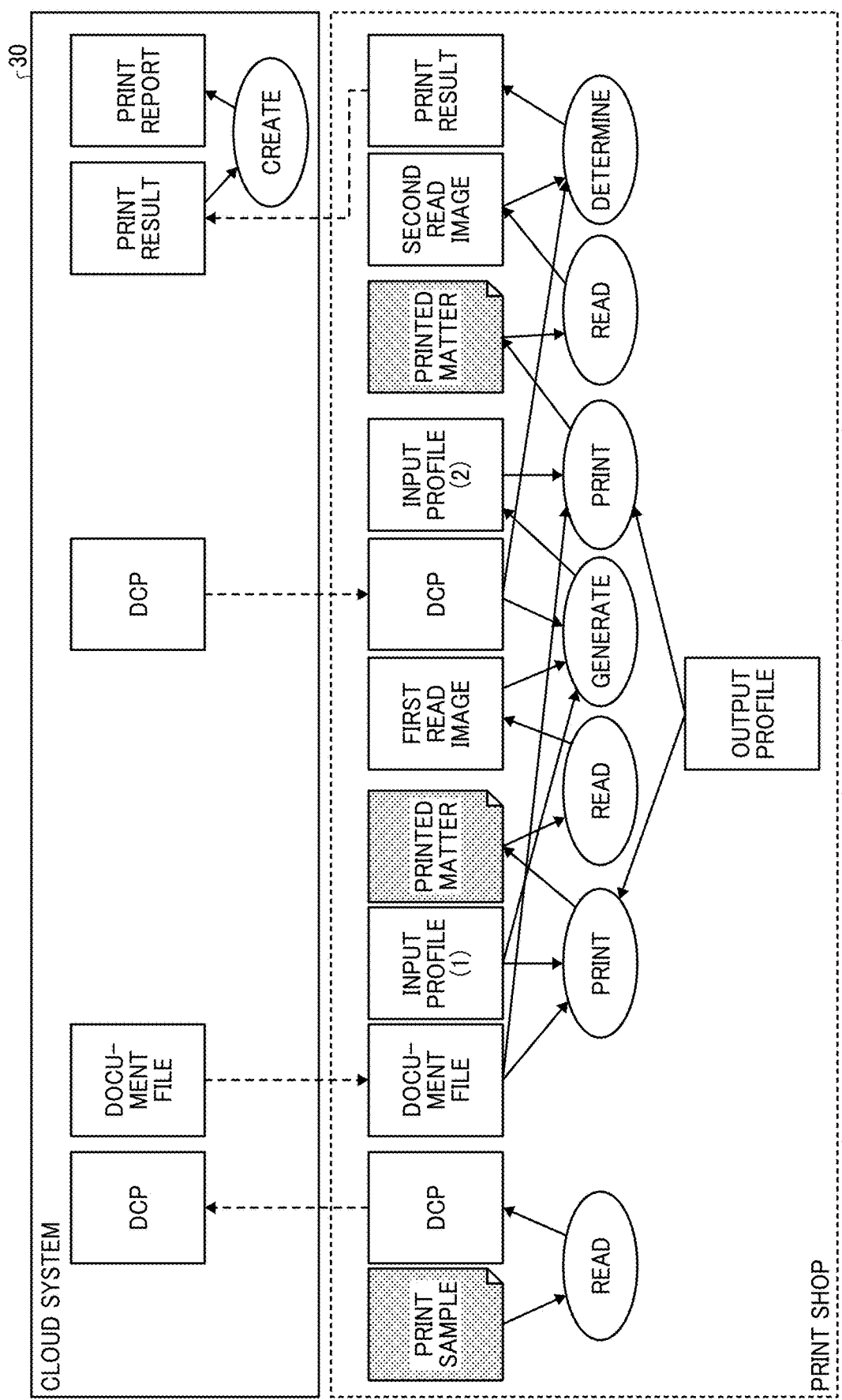
FIG. 5 is a schematic diagram illustrating an example of data processing performed by the color adjustment system when a print sample is used, according to one embodiment of the present disclosure.
Figure 6:
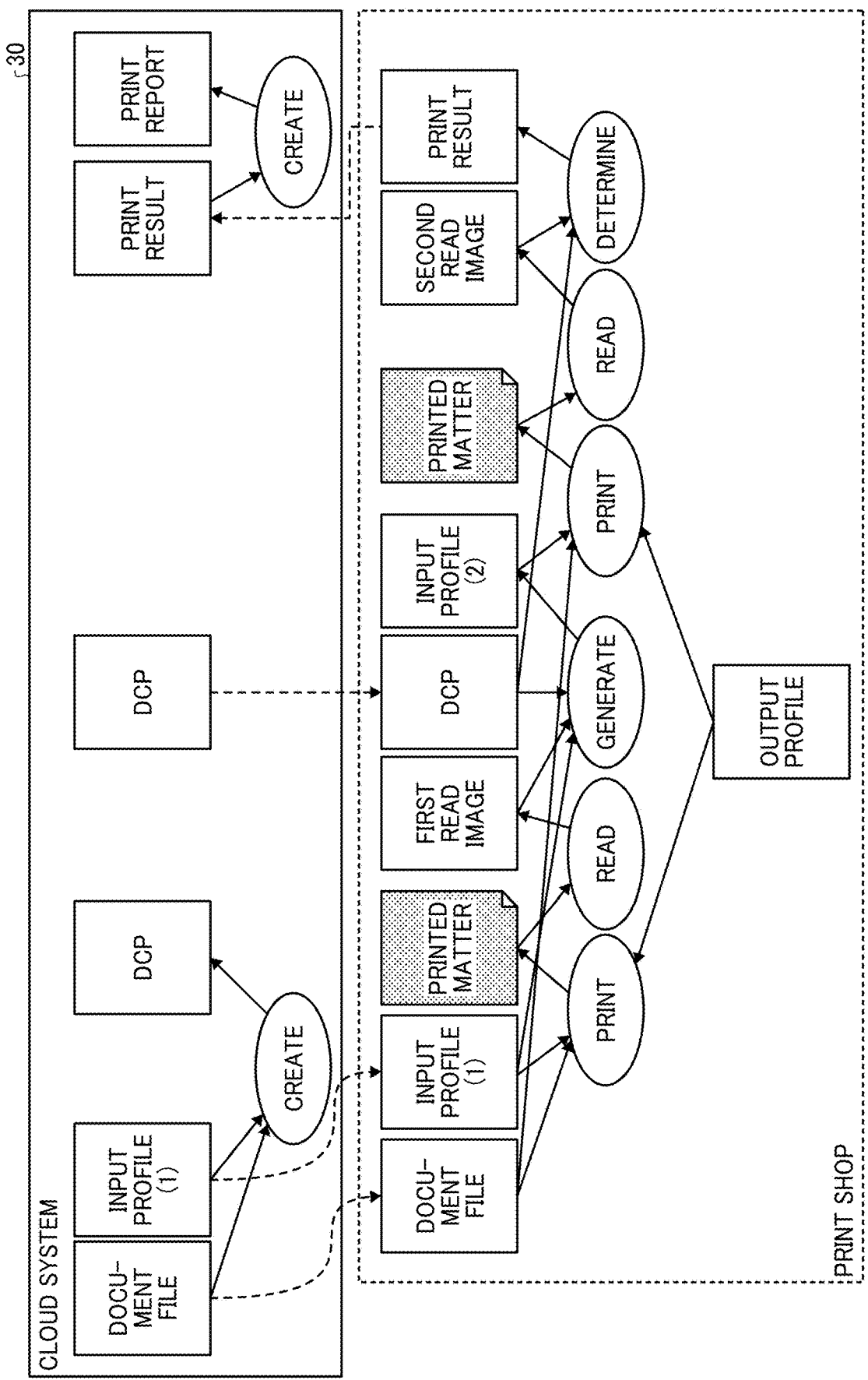
FIG. 6 is a schematic diagram illustrating an example of data processing performed by the color adjustment system when a color conversion rule is designated, according to one embodiment of the present disclosure.

FIG. 4 is a block diagram illustrating an example of a functional configuration of the color adjustment system according to the present embodiment. FIG. 5 is a schematic diagram illustrating an example of data processing performed by the color adjustment system when a print sample is used, according to the present embodiment. FIG. 6 is a schematic diagram illustrating an example of data processing performed by the color adjustment system when a color conversion rule is designated, according to the present embodiment. Descriptions are given below of the functional configuration and operation of the color adjustment system 1 according to the present embodiment, with reference to FIGS. 4 to 6.

As illustrated in FIG. 4, a control application 110 and a web browser 120 are installed in the control server 11 of the image reading system 10 as software for implementing individual functions. The control server 11 includes a communication unit 111, an image reading control unit 112 (reading control unit), a transmission unit 113, a DCP acquisition unit 114, the color matching unit 115 (an example of a generation unit), a print control unit 116, and a print result determination unit 117 (an example of a determination unit) as functional units implemented when the control application 110 is executed by the CPU 601.

The web browser 120 is software for receiving inputs of various kinds of data and input operations for executing various kinds of processing via a screen provided by a web user interface (UI) 320 of the cloud system 30. Alternatively, the web browser 120 may be installed and operating on, instead of the control server 11, a terminal apparatus such as a PC held by the printing company.

The communication unit 111 is a functional unit that performs data communication with the cloud system 30 and the printer 20 via the network I/F 609. In particular, the communication unit 111 establishes a communication connection based on WebSocket or the like to implement bidirectional communication with the cloud system 30.

The image reading control unit 112 is a functional unit that controls reading processing performed by the scanner 12. The image reading control unit 112 acquires a print sample read image (print sample read image data) obtained by the scanner 12 reading the print sample. The image reading control unit 112 also acquires a first read image (first read image data) read by the scanner 12 reading a printed matter that has been printed by the printer 20 using an existing input profile (first input profile) before another input profile is generated by the color matching unit 115. The image reading control unit 112 also acquires a second read image (second read image data) read by the scanner 12 reading a printed matter that has been printed by the printer 20 using the other input profile (second input profile) generated by the color matching unit 115.

The transmission unit 113 is a functional unit that transmits the print sample read image read by the scanner 12 to the cloud system 30 via the communication unit 111 under the control of the image reading control unit 112. The transmission unit 113 also transmits a determination result for the read image of the printed matter of the document file included in the job data determined by the print result determination unit 117 to the cloud system 30 as a print result via the communication unit 111.

The DCP acquisition unit 114 is a functional unit that acquires a DCP corresponding to the job data from the cloud system 30 via the communication unit 111 in order for the color matching unit 115 to generate the input profile.

The color matching unit 115 is a functional unit that performs color matching based on the existing input profile, the first read image (first read image data) of the job data, and the DCP (color sample data) corresponding to the job data to generate an input profile that facilitates color conversion to bring color of a printed matter to be printed based on the job data closer to the color represented by the DCP. In this case, the color matching unit 115 may update the existing input profile to generate the input profile. The input profile generated by the color matching unit 115 is managed by the control server 11 or the cloud system 30 with identification information such as a part number, and may be used for printing processing of other job data. In addition to the input profile updated from the existing input profile, the color matching unit 115 may newly generate an input profile based on the first read image and the DCP.

The print control unit 116 is a functional unit that controls printing processing performed by the printer 20. For example, the print control unit 116 causes the printer 20 to perform the printing processing for the job data in accordance with a print instruction from the cloud system 30. In addition, the print control unit 116 transmits the input profile generated by the color matching unit 115 to the printer 20 to apply the input profile to the printing processing performed by the printer 20.

The print result determination unit 117 is a functional unit that determines an average color difference ΔE between the second read image of the printed matter for which the input profile generated by the color matching unit 115 is used and the DCP, and outputs the determination result as a print result. In addition, the print result determination unit 117 generates a difference image between the DCP and the second read image. The print result determination unit 117 transmits the print result and the difference image to the cloud system 30 via the communication unit 111.

At least a part of functional units among the functional units illustrated in FIG. 4 implemented by the control application 110 of the control server 11 being executed may be implemented by a hardware circuit such as a field-programmable gate array (FPGA) or an ASIC.

Further, each functional unit illustrated in FIG. 4 implemented by the control application 110 being executed is a conceptual representation of a function, and the functional configuration of the control application 110 is not limited thereto. For example, two or more of the functional units of the control application 110 illustrated in FIG. 4 as independent units may be integrated into a single functional unit. By contrast, a plurality of functions provided by one functional unit of the control application 110 illustrated in FIG. 4 may be divided and allocated to a plurality of functional units.

As illustrated in FIG. 4, an application 300 and the web UI 320 are installed in the cloud system 30 as software for implementing individual functions, and a storage unit 310 is included in the cloud system 30. The cloud system 30 includes a first registration unit 301 (an example of a first registration unit), a reading instruction unit 302, a second acquisition unit 303, a DCP creation unit 304 (first creation unit), a DCP registration unit 304a (an example of a second registration unit), a print management unit 305, a transmission unit 306, a report creation unit 307 (second creation unit), and a communication unit 308 as functional units implemented when the application 300 is executed by the CPU 601.

The web UI 320 is software that communicates with a web browser 401 of the PC 40 and the web browser 120 of the control server 11, provides information on a screen to be displayed by each browser, and receives information input by a user via the screen displayed by each browser. In addition, the web UI 320 causes the web browser 401 of the PC 40 and the web browser 120 of the control server 11 to perform display and change display from the cloud system 30 in some cases. The web UI 320 is an example of a display control unit that provides a terminal apparatus with information on a screen and causes the terminal apparatus to display the screen.

The first registration unit 301 is a functional unit that acquires job data and setting information for creating a DCP from the PC 40 via the web UI 320. The setting information for creating a DCP includes a page number of a print sample used as a target, a target color difference, a name of the DCP, and the like in a case where the DCP is to be created using the print sample. In a case where a DCP is to be created based on a color conversion rule, the setting information includes a designated color conversion rule, a target color difference, a name of the DCP, and the like. The first registration unit 301 registers (stores) the job data and the setting information in the storage unit 310. In addition, the first registration unit 301 acquires, via the web UI 320, a print instruction to perform printing processing using a DCP for the job data selected by the print shop. Note that the term "registration" refers to storing information (data) in a storage unit (the storage unit 310 in this example).

The reading instruction unit 302 is a functional unit that transmits a reading instruction to perform reading processing on a print sample to the image reading system 10 in a case where the setting information for creating a DCP is acquired by the first registration unit 301.

The second acquisition unit 303 is a functional unit that acquires, from the image reading system 10 via the communication unit 308, a read image (print sample read image) of the print sample read by the image reading system 10 in response to the reading instruction to perform reading processing on the print sample transmitted by the reading instruction unit 302.

The DCP creation unit 304 is a functional unit that creates a DCP based on the print sample read image acquired by the second acquisition unit 303 and the setting information for creating a DCP acquired by the first registration unit 301 in the case where the DCP is created using the print sample. In addition, in a case where a DCP is created based on a color conversion rule, the DCP creation unit 304 creates the DCP based on the setting information for creating a DCP acquired by the first registration unit 301 (including information on designation of the color conversion rule) and a document file (portable document format (PDF) file or the like) included in the job data. The color conversion rule refers to a rule of a color sample conforming to an international standard such as "Japan Color," "G7," or "Fogra," or a rule of custom color determined by individual print shops. The DCP registration unit 304a is a functional unit that registers (stores) a DCP created by the DCP creation unit 304 in the storage unit 310 in association with job data acquired by the first registration unit 301. The DCP registration unit 304a is an example of a second registration unit. The DCP registration unit 304a registers the DCP (color sample data) in the storage unit 310 in association with job data. Alternatively, the DCP registration unit 304a may register the color sample data in the storage unit 310 in association with the job data. The first registration unit and the second registration unit may be configured by a single registration unit or separate registration units.

A DCP created by the DCP creation unit 304 is stored in the storage unit 310 with identification information such as a part number. A DCP designated with identification information such as an existing DCP can be used in generating an input profile performed by the image reading system 10.

The print management unit 305 is a functional unit that transmits, to the image reading system 10 via the communication unit 308, a print instruction to perform printing processing for job data using an existing input profile before color sample matching to be performed by the color matching unit 115 or a print instruction to perform printing processing for job data using an input profile generated by the color sample matching performed by the color matching unit 115.

The transmission unit 306 is a functional unit that reads out a DCP to be used for color sample matching performed by the color matching unit 115 from the storage unit 310 and transmits the DCP to the image reading system 10 via the communication unit 308.

The report creation unit 307 creates a print report based on a print result output by the print result determination unit 117. The report creation unit 307 registers (stores) the print report in the storage unit 310.

The communication unit 308 is a functional unit that performs data communication with the control server 11 via the network I/F 609. In particular, the communication unit 308 establishes a communication connection based on WebSocket or the like to implement bidirectional communication with the control server 11.

The storage unit 310 is a functional unit that stores various kinds of data. As illustrated in FIG. 4, the information stored in the storage unit 310 includes, for example, job data registered by the PC 40, a document file corresponding to the job data, a DCP created by the DCP creation unit 304, a standard input profile, an input profile (generated input profile) generated by the color matching unit 115, a first read image, a second read image, a print report created by the report creation unit 307, brand owner information, printing company information, printer information, and the like. Alternatively, the standard input profile and the generated input profile may be managed by the control server 11 or the printer 20. The storage unit 310 is implemented by the auxiliary memory 605 illustrated in FIG. 3.

At least a part of functional units among the functional units illustrated in FIG. 4 implemented by the application 300 of the cloud system 30 being executed may be implemented by a hardware circuit such as an FPGA or an ASIC.

Further, each functional unit illustrated in FIG. 4 implemented by the application 300 being executed is a conceptual representation of a function, and the functional configuration of the application 300 is not limited thereto. For example, two or more of the functional units of the application 300 illustrated as independent units in FIG. 4 may be integrated into a single functional unit. By contrast, a plurality of functions provided by one functional unit of the application 300 illustrated in FIG. 4 may be divided and allocated to a plurality of functional units.

As illustrated in FIG. 4, the web browser 401 is installed in the PC 40. The web browser 401 is software for receiving inputs of various kinds of data and input operations for executing various kinds of processing via a screen provided by the web UI 320 of the cloud system 30.

Figure 8:
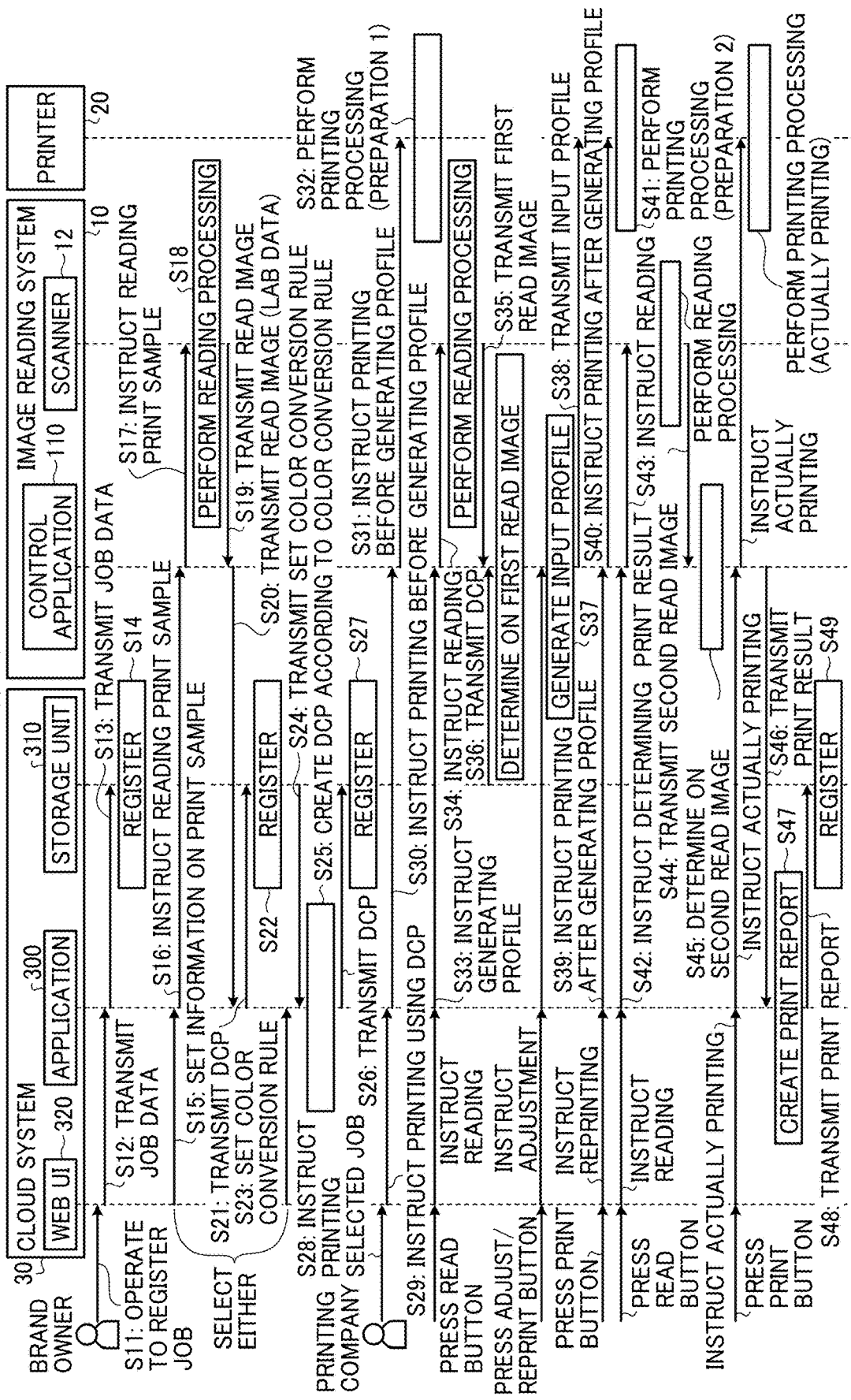
FIG. 8 is a sequence chart illustrating an example of color adjustment processing performed by the color adjustment system according to one embodiment of the present disclosure.

Next, with reference to FIG. 5, a description is given of data processing in creating a DCP using a print sample. It is assumed that a particular print shop holding the image reading system 10 has received a print sample from a brand owner in advance, and the description is given focusing on data generation and processing. However, it is only necessary that the print shop holding the image reading system 10 has received the print sample in advance. Other print shops that perform processing for job data corresponding to the print sample do not necessarily have the print sample (or a copy thereof). Further, in a case where an entity holding the image reading system 10 is the print management company, the calibration site, or the brand owner itself, the print shop does not necessarily have the print sample. As illustrated in FIG. 8 to be described later, the brand owner can select whether to create a DCP using the print sample or to create a DCP based on a color conversion rule.

The image reading control unit 112 of the control server 11 included in the image reading system 10 causes the scanner 12 to perform reading processing on the print sample to acquire a print sample read image. The transmission unit 113 of the control server 11 transmits the print sample read image to the cloud system 30. The second acquisition unit 303 of the cloud system 30 acquires the print sample read image from the image reading system 10. The DCP creation unit 304 of the cloud system 30 creates a DCP based on the print sample read image and setting information for creating a DCP. The DCP registration unit 304a registers (stores) the DCP in the storage unit 310.

The print control unit 116 of the control server 11 receives the job data together with a print instruction from the cloud system 30. The print control unit 116 causes the printer 20 to perform printing processing of a document file included in the job data using an existing input profile (input profile (1) illustrated in FIG. 5) and the output profile. The image reading control unit 112 causes the scanner 12 to perform reading processing on a printed matter (first printed matter) printed by the printer 20 to acquire a first read image (first read image data) of the printed matter.

The DCP acquisition unit 114 of the control server 11 acquires a DCP corresponding to the job data from the cloud system 30. The color matching unit 115 of the control server 11 generates, based on the existing input profile (input profile (1)), the first read image, and the DCP acquired by the DCP acquisition unit 114, an input profile (input profile (2) illustrated in FIG. 5) that facilitates color conversion to bring color of a printed matter to be printed based on the job data closer to the color represented by the DCP.

The print control unit 116 causes the printer 20 to perform printing processing of the document file included in the job data using the input profile (input profile (2)) generated by the color matching unit 115 and the output profile. The image reading control unit 112 causes the scanner 12 to perform reading processing on the printed matter (second printed matter) printed by the printer 20 to acquire a second read image (second read image data) of the printed matter.

The print result determination unit 117 of the control server 11 determines a color difference or the like between the first read image (first read image data) and the second read image (second read image data), outputs a determination result as a print result, and transmits the print result to the cloud system 30. The report creation unit 307 of the cloud system 30 creates a print report based on the print result and registers (stores) the print report in the storage unit 310.

Next, with reference to FIG. 6, a description is given of data processing in creating a DCP based on a color conversion rule. The description is given focusing on data generation and processing.

The DCP creation unit 304 of the cloud system 30 creates a DCP based on setting information for creating a DCP (including the color conversion rule) (including the input profile (1) illustrated in FIG. 6) and a document file included in job data. The DCP registration unit 304a registers (stores) the DCP in the storage unit 310.

The print control unit 116 of the control server 11 receives the job data together with a print instruction from the cloud system 30. The print control unit 116 may acquire the input profile (1) from the cloud system 30. The print control unit 116 causes the printer 20 to perform printing processing of the document file included in the job data using the input profile (1) and the output profile. The image reading control unit 112 causes the scanner 12 to perform reading processing on the printed matter (first printed matter) printed by the printer 20 to acquire a first read image of the printed matter.

The DCP acquisition unit 114 of the control server 11 acquires a DCP corresponding to the job data from the cloud system 30. The color matching unit 115 of the control server 11 generates, based on the input profile (1), the first read image, and the DCP acquired by the DCP acquisition unit 114, an input profile (input profile (2) illustrated in FIG. 6) that facilitates color conversion to bring color of a printed matter to be printed based on the job data closer to the color represented by the DCP.

The print control unit 116 causes the printer 20 to perform printing processing of the document file included in the job data using the input profile (input profile (2)) generated by the color matching unit 115 and the output profile. The image reading control unit 112 causes the scanner 12 to perform reading processing on the printed matter (second printed matter) printed by the printer 20 to acquire a second read image of the printed matter.

The print result determination unit 117 of the control server 11 determines a color difference or the like between the first read image and the second read image, outputs the determination result as a print result, and transmits the print result to the cloud system 30. The report creation unit 307 of the cloud system 30 creates a print report based on the print result, and registers (stores) the print report in the storage unit 310.

Data Structure of Color Adjustment System

Figure 7:
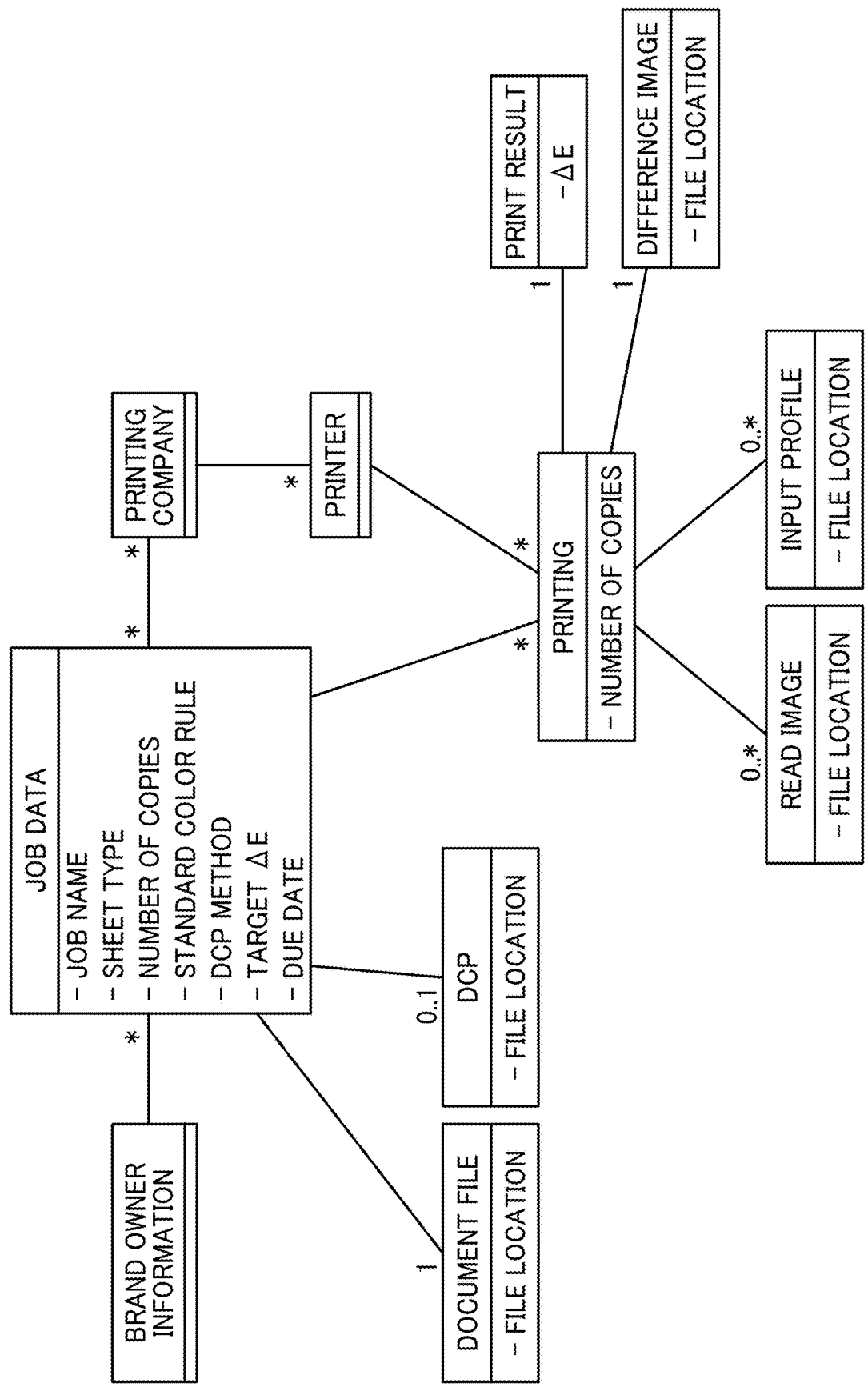
FIG. 7 is a schematic diagram illustrating an example of a data structure of data handled by the color adjustment system according to one embodiment of the present disclosure.

FIG. 7 is a schematic diagram illustrating an example of a data structure of data handled by the color adjustment system according to the present embodiment. A description is given of an outline of a data structure of data handled by the color adjustment system 1 according to the present embodiment with reference to FIG. 7.

Examples of information included in the job data acquired by the first registration unit 301 of the cloud system 30 and registered in the storage unit 310 are as follows.
  job name;
  sheet type;
  number of copies;
  standard color space;
  DCP method;
  target ΔE; and
  due date The job data includes the document file itself such as a PDF file or document file association information. The document file is illustrated in FIG. 7 as information associated with the job data. The document file association information included in the job data may be a file location indicating a storage area in which the document file is stored.

The job data is also associated with the DCP created by the DCP creation unit 304. The DCP associated with the job data may actually be a file location indicating a storage area in which the DCP is stored.

The job data is also associated with information on a printing company that performs processing for the job data. Further, the information on the printing company is associated with information on individual printers (printing machines) held by the printing company.

Further, the job data is associated with information (brand owner information) on a brand owner who has requested printing, information on a printing company (print shop) requested to print, and information on printing. The information on printing is information for managing printing processing performed by a plurality of print shops and a plurality of printers for the same job data, and includes at least information on the number of copies to be printed by each printer. In addition, the information on printing is associated with read images (the first read image and the second read image described above), input profiles (a standard input profile, an input profile for defining a color conversion rule, and an input profile (a generated input profile) generated by the color matching unit 115), and a print result created by the print result determination unit 117 and a difference image generate by the print result determination unit 117. The read images, the input profiles, and the difference image associated with the information on printing may actually be file locations indicating storage areas in which these images and profiles are stored. The print result includes at least an average color difference ΔE.

Color Adjustment Processing Performed by Color Adjustment System

Figures 11, 12:
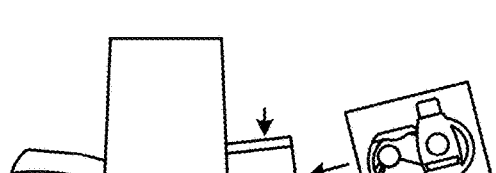
FIG. 11 is a diagram illustrating an example of a DCP creation method selection screen according to one embodiment of the present disclosure.
FIG. 12 is a diagram illustrating an example of a print sample reading screen according to one embodiment of the present disclosure.
Figure 15:
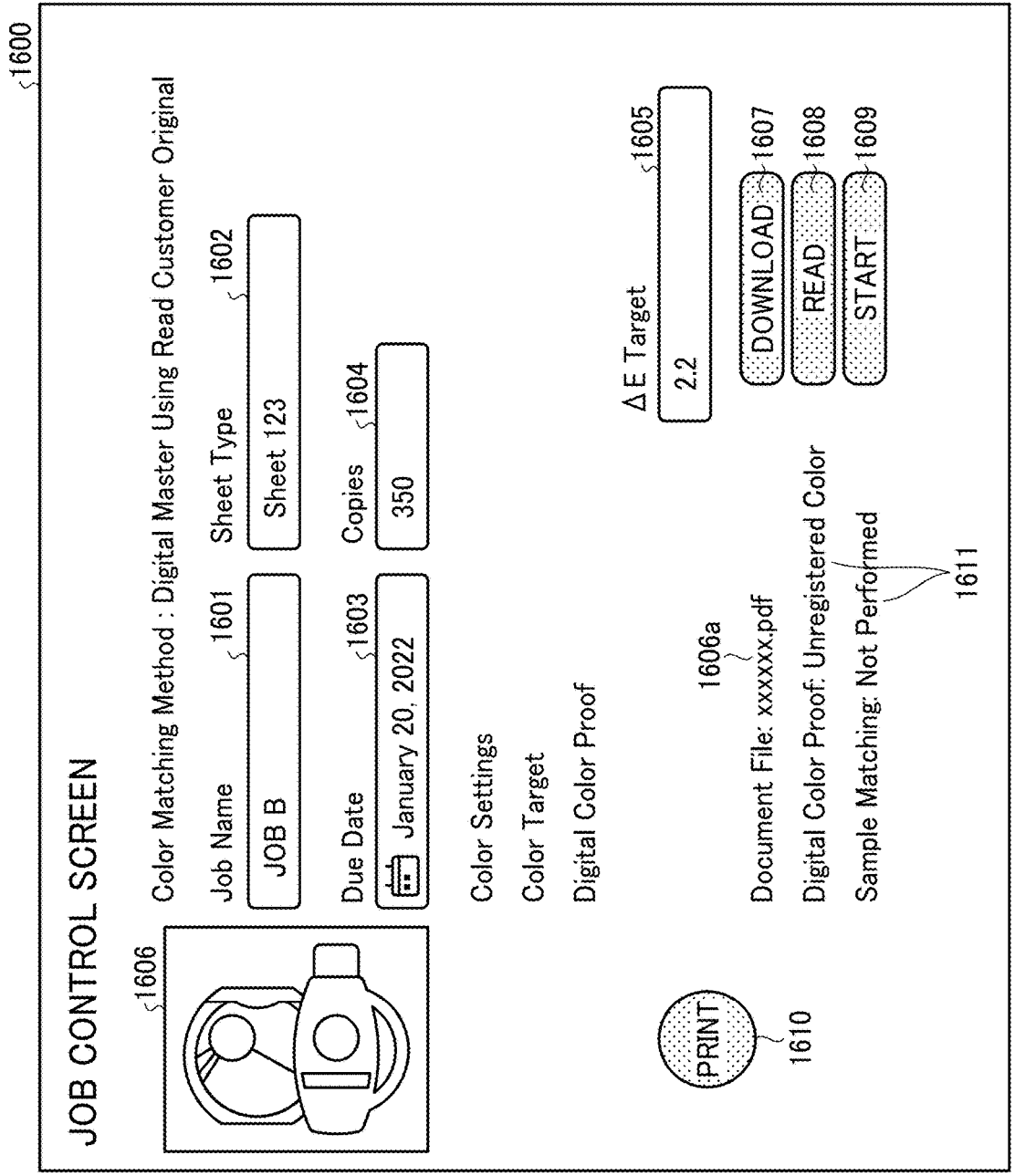
FIG. 15 is a diagram illustrating an example of a job control screen according to one embodiment of the present disclosure.
Figures 17, 18:
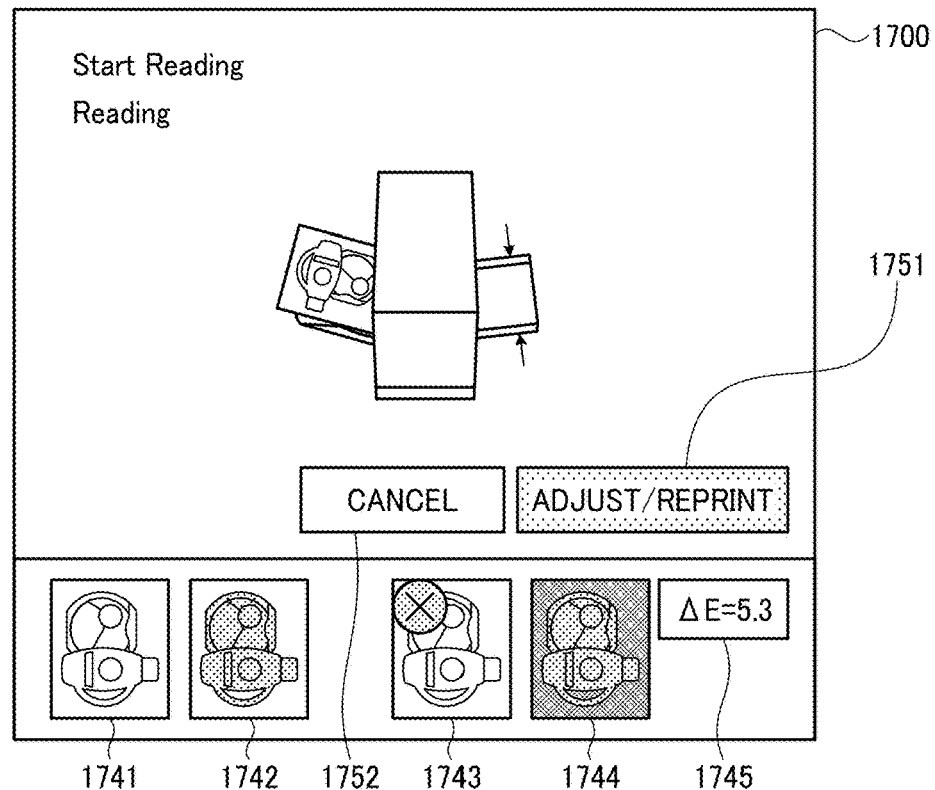
FIG. 17 is a diagram illustrating an example of the print result determination screen presenting a state where a determination result is not satisfactory according to one embodiment of the present disclosure.
FIG. 18 is a diagram illustrating an example of a print report according to one embodiment of the present disclosure.

FIG. 8 is a sequence chart illustrating an example of color adjustment processing performed by the color adjustment system according to the present embodiment. FIG. 9 is a diagram illustrating an example of a job list screen according to the present embodiment. FIG. 10 is a diagram illustrating an example of a job registration screen according to the present embodiment. FIG. 11 is a diagram illustrating an example of a DCP creation method selection screen according to the present embodiment. FIG. 12 is a diagram illustrating an example of a print sample reading screen according to the present embodiment. FIG. 13 is a diagram illustrating an example of a color conversion rule designation screen according to the present embodiment. FIG. 14 is a diagram illustrating an example of a job selection screen according to the present embodiment. FIG. 15 is a diagram illustrating an example of a job control screen according to the present embodiment. FIGS. 16A to 16C are diagrams illustrating an example of operations using a print result determination screen according to the present embodiment. FIG. 17 is a diagram illustrating an example of the print result determination screen presenting a state where a determination result is not satisfactory according to the present embodiment. FIG. 18 is a diagram illustrating an example of a print report according to the present embodiment. Descriptions are given of color adjustment processing performed by the color adjustment system 1 according to the present embodiment with reference to FIGS. 8 to 18.

As illustrated in FIG. 8, the color adjustment processing includes registration of job data by the brand owner (steps S11 to S14), registration of a DCP associated with the job data (steps S15 to S27), execution of updating an input profile performed by the printing company as color sample matching (steps S28 to S38), color difference determination using the updated input profile (steps S39 to step S45), and execution of actual printing processing and creation of a print report (steps S46 to S49).

Step S11

The brand owner registers job data for which printing is requested via the web browser 401 of the PC 40. In other words, the brand owner registers a job of printing. Specifically, the brand owner first causes the web browser 401 to display a job list screen 1000 illustrated in FIG. 9.

As illustrated in FIG. 9, the job list screen 1000 includes a job registration button 1001 and a job list display area 1002. The job registration button 1001 is a button used for registering job data for which printing is newly requested in the cloud system 30. The job list display area 1002 is an area in which a list of job data that has already been registered in the cloud system 30 is displayed.

When the brand owner presses the job registration button 1001, the web browser 401 displays a job registration screen 1100 illustrated in FIG. 10.

The job registration screen 1100 is a screen for registering job data for which printing is newly requested. As illustrated in FIG. 10, the job registration screen 1100 includes a job name input field 1101, a document file designation field 1102, a number of copies input field 1103, a standard selection section 1104, a standard profile designation field 1105, a DCP creation selection section 1106, a target color difference input field 1107, a due date input field 1108, a next button 1111, and a cancel button 1112.

The job name input field 1101 is an input field for setting a name of job data for which printing is newly requested. The document file designation field 1102 is a field for selectively designating a document file such as a PDF file to be printed from files stored in the PC 40 or the like. The number of copies input field 1103 is an input field for setting the number of copies to be printed for the document file. The standard selection section 1104 is a radio button for selecting use of an input profile (standard input profile) of the standard of International Organization for Standardization (ISO) without creating a DCP. The standard profile designation field 1105 is a field for selectively designating a standard input profile when the standard selection section 1104 is selected. The DCP creation selection section 1106 is a radio button for selecting creation of a DCP. The target color difference input field 1107 is an input field for setting a target average color difference ΔE in comparison with the DCP. The due date input field 1108 is an input field for setting a due date for delivery of a printed matter of newly registered job data. The next button 1111 is a button for registering job data in a case where the standard selection section 1104 is selected. In a case where the DCP creation selection section 1106 is selected, the next button 1111 serves as a button for transitioning to a DCP creation method selection screen 1200 illustrated in FIG. 11. The cancel button 1112 is a button for canceling the settings input on the job registration screen 1100 and returning to the job list screen 1000. The job registration screen 1100 may further include a field for selecting a sheet type which is a type of sheet used for printing.

The brand owner sets various items of setting information on the job registration screen 1100, and presses the next button 1111 in a state where the DCP creation selection section 1106 is selected. Then, the web browser 401 displays the DCP creation method selection screen 1200 illustrated in FIG. 11.

The DCP creation method selection screen 1200 is a screen for selecting a DCP creation method. As illustrated in FIG. 11, the DCP creation method selection screen 1200 includes a sample reading selection section 1201, a sample reading request selection section 1202, a color conversion rule designation selection section 1203, a next button 1211, and a cancel button 1212.

The sample reading selection section 1201 is a radio button to be selected when the brand owner holds the image reading system 10 and performs reading processing on a print sample by the brand owner itself. The sample reading request selection section 1202 is a radio button to be selected when the brand owner does not hold the image reading system 10 and requests the print management company, the calibration site, or the printing company (print shop) holding the image reading system 10 to perform reading processing on a print sample. The color conversion rule designation selection section 1203 is a radio button to be selected when a DCP is to be created based on a color conversion rule. The next button 1211 is a button for transitioning to a print sample reading screen 1300 illustrated in FIG. 12 in a case where the sample reading selection section 1201 or the sample reading request selection section 1202 is selected. When the next button 1211 is pressed in a state where the sample reading request selecting section 1202 is selected, a reading request destination selection screen for selecting a printing company that performs reading or a screen for sending a notification of a reading request may be displayed. In such a case, when a uniform resource locator (URL) included in the notification sent by e-mail is opened, the print sample reading screen 1300 may be displayed on a web browser of a terminal apparatus of a printing company (that has received the reading request) selected as the reading request destination, thereby allowing the printing company to input setting information and perform the reading processing. In a case where the reading processing is requested to the same printing company to which the printing processing is requested, the print sample is read by a reading apparatus held by the printing company. On the other hand, in a case where the reading processing is requested to another party other than the printing company to which the printing processing is requested, the print sample is read by another reading apparatus different from the reading apparatus held by the printing company. In a case where the color conversion rule designation selection section 1203 is selected, the next button 1211 servers as a button for transitioning to a color conversion rule designation screen 1400 illustrated in FIG. 13. The cancel button 1212 is a button for returning to the job registration screen 1100. The web UI 320 that provides the DCP creation method selection screen 1200 corresponds to a second reception unit.

Step S12

When the brand owner presses the next button 1211 on the DCP creation method selection screen 1200, the web browser 401 transmits the setting information set on the job registration screen 1100 and the job data including the document file selectively designated in the document file designation field 1102 from the files stored in the PC 40 or the like to the cloud system 30. The first registration unit 301 of the cloud system 30 acquires the job data and the setting information via the web UI 320.

Steps S13 and S14

The first registration unit 301 registers (stores) the job data and the setting information in the storage unit 310.

Step S15

When the brand owner presses the next button 1211 on the DCP creation method selection screen 1200 in a state where the sample reading request selection section 1202 is selected, the web browser 401 displays the print sample reading screen 1300 illustrated in FIG. 12. The processing up to step S22 below is described on the assumption that the print sample reading screen 1300 is displayed on the web browser 401 of the terminal apparatus held by the brand owner, DCP setting information (a name of a DCP, page setting) is registered in the cloud system 30 (step S15), and the print sample is read (step S18) by the printing company requested to perform the reading processing. After the reading request is sent, the print sample reading screen 1300 is displayed on the web browser of the terminal apparatus held by the printing company requested to perform the reading processing and the printing company may collectively perform inputting the DCP setting information, the reading processing on the sample print, and registration of the DCP.

The print sample reading screen 1300 is a screen for causing the image reading system 10 to perform reading processing on a print sample and causing the cloud system 30 to create a DCP. As illustrated in FIG. 12, the print sample reading screen 1300 includes a DCP name input field 1301, a reference page designation field 1302, an execution button 1303, a progress status display area 1304, and a registration button 1305.

The DCP name input field 1301 is an input field for setting a name of a DCP to be created. The reference page designation field 1302 is an input field for setting a reference page to be read by the scanner 12 in a print sample. Note that the reference page designation field 1302 may be a field for registering all pages of the print sample as a DCP by causing the all the pages of the print sample to be read, as well as designating a number of page in the print sample (DCP) to be used at the time of performing printing processing for job data. The execution button 1303 is a button for causing the image reading system 10 to perform reading processing on a print sample. The progress status display area 1304 is a display area for indicating progress status of reading processing on a print sample. For example, in the progress status display area 1304, a lamp of the item "Sample Reading" is turned on before the reading processing on the print sample is performed, a lamp of the item "Reading in Progress" is turned on when the execution button 1303 is pressed, and a lamp of the item "Completed" is turned on when the reading process on the print sample has been performed. The registration button 1305 is a button for creating a DCP using a print sample read image obtained by reading processing on a print sample and registering the DCP, and is enabled after the lamp of the item "Completed" is turned on in the progress status display area 1304.

When the brand owner presses the execution button 1303 on the print sample reading screen 1300, the web browser 401 transmits the setting information (setting information for creating a DCP described above) set in the print sample reading screen 1300 to the cloud system 30. The first registration unit 301 of the cloud system 30 acquires the setting information for creating a DCP via the web UI 320. In response to an execution instruction by pressing the execution button 1303, the setting information is registered in the cloud system 30 (step S15) and a reading instruction (step S16) is also transmitted from the cloud system 30 to the image reading system 10, which will be described later. The execution button 1303 is an example of a visual representation included in screen information of the print sample reading screen 1300. The reading instruction is transmitted from the cloud system 30 to the image reading system 10 via the communication units (the communication unit 308 of the cloud system 30 and the communication unit 111 of the image reading system 10). For this reason, in a state in which the connection of bidirectional communication (WebSocket) between the communication units is not established, communication cannot be performed from the outside beyond the firewall on the image reading system 10 side. Accordingly, the reading instruction (step S16) cannot be transmitted when the execution button 1303 is pressed. Therefore, in a case where the communication unit 308 of the cloud system 30 determines that the bidirectional communication between the cloud system 30 and the image reading system 10 is not established (for example, a state in which the connection is not set or communication is inactive), the execution button 1303 on the print sample reading screen 1300 of the web browser 401 may be grayed out so that the execution button 1303 is prevented from being pressed (execution instruction) or the appearance of the execution button 1303 may be changed to indicate that the execution button 1303 is inoperable. Further, a notification indicating that the communication between the cloud system 30 and the image reading system 10 of the printing company requested to perform the reading processing is not established may be displayed on the screen of the web browser 401, and a notification such as an e-mail that prompts the printing company holding the image reading system 10 to confirm connection settings or connection status may be automatically sent. Thus, the person who has requested the reading processing (the brand owner in this example) can easily understand the situation, and the printing company is prompted to perform necessary operations. Since a print instruction, a reading instruction, and an adjust/reprint instruction, which will be described later, are also instructions from a cloud system to an image reading system, similar display changes may be performed and similar notifications may be sent.

Step S16

When the setting information for creating a DCP is acquired by the first registration unit 301, the reading instruction unit 302 of the cloud system 30 transmits a reading instruction to perform the reading processing on the print sample together with the setting information to the image reading system 10 via the communication unit 308.

Step S17

In response to receiving the reading instruction to perform the reading processing on the print sample and the setting information from the cloud system 30 via the communication unit 111, the image reading control unit 112 of the control server 11 included in the image reading system 10 causes the scanner 12 to read the reference page indicated by the setting information in the print sample.

Steps S18 and S19

The operator (the operator of the printing company owning the print shop in this example) of the image reading system 10 sets the print sample on the scanner 12 so that the reference page indicated by the setting information transmitted from the cloud system 30 is read. In this case, the operator (the operator of the printing company owning the print shop in this example) of the image reading system 10 is also a person who holds the print sample. The scanner 12 performs the reading processing on the reference page in the print sample, and transmits a read image (print sample read image) formed of the Lab value or the like obtained by performing the reading processing on the print sample to the control server 11. The image reading control unit 112 acquires the print sample read image from the scanner 12.

Step S20

The image reading control unit 112 transmits the print sample read image to the cloud system 30 via the communication unit 111. The second acquisition unit 303 of the cloud system 30 acquires the print sample read image via the communication unit 308.

Steps S21 and S22

After confirming the completion of the reading processing on the print sample performed by the image reading system 10, the brand owner presses the registration button 1305 on the print sample reading screen 1300. Then, the web browser 401 transmits, to the cloud system 30, an instruction to create a DCP using the print sample read image and to register the DCP. In response to receiving the instruction from the cloud system 30 via the communication unit 308, the DCP creation unit 304 creates a DCP based on the print sample read image acquired by the second acquisition unit 303 and the setting information for creating a DCP acquired by the first registration unit 301. The DCP registration unit 304a registers (stores) the DCP in the storage unit 310 in association with the job data acquired by the first registration unit 301.

Step S23

When the brand owner presses the next button 1211 on the DCP creation method selection screen 1200 in a state where the color conversion rule designation selection section 1203 is selected, the web browser 401 displays the color conversion rule designation screen 1400 illustrated in FIG. 13.

The color conversion rule designation screen 1400 is a screen for causing the cloud system 30 to create a DCP in accordance with a color conversion rule. As illustrated in FIG. 13, the color conversion rule designation screen 1400 includes a DCP name input field 1401, a color conversion rule selection field 1402, a creation button 1411, and a cancel button 1412.

The DCP name input field 1401 is an input field for setting a name of a DCP to be created. The color conversion rule selection field 1402 is a button for selecting a rule of a color sample conforming to the international standard such as "Japan Color," "G7," or "Fogra," or a rule of custom color determined by individual print shops. The creation button 1411 is a button for creating a DCP in the cloud system 30 in accordance with the color conversion rule selected in the color conversion rule selection field 1402 and registering the DCP. The cancel button 1412 is a button for returning to the DCP creation method selection screen 1200.

When the brand owner presses the creation button 1411 on the color conversion rule designation screen 1400, the web browser 401 transmits the setting information (setting information for creating a DCP described above) set in the color conversion rule designation screen 1400 to the cloud system 30. The first registration unit 301 of the cloud system 30 acquires the setting information for creating a DCP via the web UI 320. The web UI 320 that provides the color conversion rule designation screen 1400 corresponds to a first reception unit.

Step S24

The DCP creation unit 304 of the cloud system 30 reads out, from the storage unit 310, the color conversion rule indicated by the setting information for creating a DCP acquired by the first registration unit 301.

Step S25

The DCP creation unit 304 creates a DCP based on the setting information (the name of the DCP in this case) for creating a DCP acquired by the first registration unit 301, the color conversion rule acquired by the first registration unit 301, and the document file included in the job data acquired by the first registration unit 301.

Steps S26 and S27

The DCP registration unit 304a registers (stores) the DCP in the storage unit 310 in association with the job data acquired by the first registration unit 301.

Step S28

The operator of the printing company owning the print shop performs operations for selecting the job data for which the printing processing is requested to be performed and performing the printing processing for the job data via the web browser 120 of the control server 11. Specifically, the operator of the printing company causes the web browser 120 to display a job selection screen 1500 illustrated in FIG. 14.

As illustrated in FIG. 14, the job selection screen 1500 includes a job list display area 1501 and a job registration button 1502. The job list display area 1501 is an area for displaying a list of job data, among the job data registered in the cloud system 30, for which a printing request is assigned to the print shop. The job registration button 1502 is a button for registering job data for which a printing request is received by the print shop as a separate request. The processing performed when the job registration button 1502 is pressed conforms to the processing of the job registration screen 1100. Further, the operator of the printing company may duplicate job data that has already been registered or job data for which actual printing processing has already been performed on the job selection screen 1500 and select another printer or another printing site to perform printing processing for the duplicated job data. The printing processing may be performed for the duplicated job data as separate new job data or existing job data for which the printing processing has already been performed. At this time, when job data whose DCP has already been registered in the cloud system 30 is selected and printing processing is performed for the selected job data as duplicated job data or existing job data, the same DCP is automatically used for performing color sample matching and performing printing processing for the job data. In response to receiving the print instruction, the cloud system 30 may transmit the DCP registered in association with the job data to an image reading system (control application) to which another printer is connected, the image reading system to which the another printer is connected updates a first input profile based on the first read image and the DCP transmitted from the cloud system 30 to generate a second input profile, and the cloud system 30 causes the another printer to perform printing processing using the second input profile. Thus, color sample matching and printing processing using the DCP can be easily performed at a plurality of print sites.

The operator of the printing company selects job data subjected to printing processing from the job data displayed in the job list display area 1501 on the job selection screen 1500. Then, the web browser 120 displays a job control screen 1600 illustrated in FIG. 15. When the brand owner completes the job registration using the operations illustrated in FIGS. 9 to 13 (for example, at the timing of step S14, step S22, step S27, or the like in FIG. 8), a notification may be sent to the terminal apparatus of the printing company to which the printing processing is requested by an e-mail with a URL link. When the URL link of the e-mail is opened, a web browser may be activated on the terminal apparatus of the printing company, and the job selection screen 1500 illustrated in FIG. 14 or the job control screen 1600 illustrated in FIG. 15 may be displayed.

The job control screen 1600 is a screen for confirming the contents of job data that has been selected and causing to perform printing processing for the selected job data. As illustrated in FIG. 15, the job control screen 1600 includes a job name display field 1601, a sheet type selection field 1602, a due date display field 1603, a number of copies display field 1604, a target color difference display field 1605, a document file display area 1606, a document file name display section 1606a, a download button 1607, a read button 1608, a start button 1609, a print button 1610, and a status display area 1611.

The job name display field 1601 is a field for displaying a name of the selected job data, which corresponds to the job name input field 1101 of the job registration screen 1100. The sheet type selection field 1602 is a field for designating a type of a recording medium (sheet type such as thin sheet or thick sheet, or a sheet feeding tray storing a specific type of sheet) used for printing a document file included in the selected job data. The due date display field 1603 is a field for displaying a due date of delivery of a printed matter of the selected job data, and corresponds to the due date input field 1108 of the job registration screen 1100. The number of copies display field 1604 is a field for displaying the number of copies to be printed for the document file included in the selected job data, and corresponds to the number of copies input field 1103 of the job registration screen 1100. The target color difference display field 1605 is a field for displaying a target average color difference ΔE in comparison with a DCP corresponding to the selected job data, and corresponds to the target color difference input field 1107 of the job registration screen 1100.

The document file display area 1606 is an area for displaying an image of the document file (the document file uploaded by the brand owner at the time of job registration) included in the selected job data. The document file name display section 1606a is a section for displaying the name of the document file included in the selected job data. The download button 1607 is a button for downloading the document file included in the selected job data from the cloud system 30 and storing the document file in the terminal apparatus such as a PC of the printing company for printing. As for the image to be displayed in the document file display area 1606, a thumbnail image of the document file is generated by the cloud system 30, and is acquired by a web browser of the terminal apparatus such as a PC of the printing company as apart of the job control screen 1600 to be displayed. The read button 1608 is a button for causing the image reading system 10 to perform reading processing on a print sample in a case where a DCP corresponding to the selected job data is not registered. The processing performed when the read button 1608 is pressed conforms to the processing of the print sample reading screen 1300. The start button 1609 is a button for starting color sample matching based on the selected job data. The print button 1610 is a button that is enabled after the color sample matching started by the start button 1609 is performed, and is a button for performing printing processing for job data using a generated input profile. In a case where a DCP has already been registered for the selected job data or in a case where the color sample matching has already been performed for the selected job data, the status of the item "DCP (Digital Color Proof)" and the item "Color Sample Matching" are updated to "Registered" and "Performed" respectively in the status display area 1611.

When the operator of the printing company presses the start button 1609 on the job control screen 1600, the screen transitions to a screen illustrated in FIG. 16A to be described later, and color sample matching is performed. When a print button 1711 illustrated in FIG. 16A is pressed (step S28), the web browser 120 performs the processing of step S29 to transmit, to the cloud system 30, a print instruction to perform printing processing for job data that requires color sample matching using the DCP. When an operator at an intermediary site between the orderer and the supplier, such as the above-described print management company or calibration site, logs in and performs operations on the job control screen 1600 illustrated in FIG. 15, the color sample matching start button 1609 may not be displayed on the job control screen 1600, but a screen for selectively designating a printing company or print site and a printer, and a button for transferring the job data to the selected printing company or the like on the screen may be displayed.

Step S29

The first registration unit 301 of the cloud system 30 acquires the print instruction via the web UI 320.

Step S30

When the print instruction is acquired by the first registration unit 301, the print management unit 305 of the cloud system 30 acquires the job data (selected job data) indicated by the print instruction from the storage unit 310, and transmits, to the image reading system 10 via the communication unit 308, a print instruction to perform printing processing for the job data using an existing input profile before color sample matching.

Steps S31 and S32

In response to receiving the print instruction to perform printing processing for the job data using an existing input profile via the communication unit 111, the print control unit 116 of the control server 11 included in the image reading system 10 causes the printer 20 to perform printing processing for the job data using the existing input profile. In this case, as the existing input profile, an input profile stored in the image reading system 10 or the printer 20 may be used, or an input profile downloaded from the cloud system 30 may be used.

Step S33

The print management unit 305 transmits an instruction to generate an input profile to the control application 110 of the image reading system 10 via the communication unit 308. When the operator of the printing company presses the read button 1721 illustrated in FIG. 16B, which will be described later, the cloud system 30 performs the processing of step S33 to transmit the instruction for creating an input profile to the image reading control unit 112 of the image reading system 10 via the communication unit 111.

Step S34

In response to receiving the instruction to generate an input profile via the communication unit 111, the image reading control unit 112 transmits, to the scanner 12, a reading instruction to perform reading processing on a printed matter (first printed matter) of job data for which the printing processing has been performed using the existing input profile.

Step S35

The operator (the operator of the printing company owning the print shop in this example) of the image reading system 10 sets the printed matter on the scanner 12 so that the printed matter of the job data for which printing processing has been performed using the existing input profile is read. Then, the scanner 12 performs reading processing on the printed matter, and transmits a read image (first read image) obtained by performing the reading processing on the printed matter to the control server 11. The image reading control unit 112 acquires the first read image from the scanner 12.

Step S36

The color matching unit 115 of the control server 11 included in the image reading system 10 requests the DCP corresponding to the job data acquired by the print management unit 305 from the cloud system 30. In response to the request for the DCP, the transmission unit 306 of the cloud system 30 reads out the DCP corresponding to the job data from the storage unit 310 and transmits the DCP to the image reading system 10 via the communication unit 308. The color matching unit 115 acquires the DCP from the cloud system 30 via the communication unit 111.

Step S37

The color matching unit 115 determines whether a color difference (ΔE) between the color value of the first read image and the color value of the DCP is greater than a target color difference (determination for the first read image) based on the existing input profile, the first read image acquired by the image reading control unit 112, and the DCP acquired from the cloud system 30. In a case where the color difference is greater than the target color difference, a screen illustrated in FIG. 16B transitions to a screen illustrated in FIG. 17 to be described later. When an adjust/reprint button 1751 is pressed, an execution instruction is transmitted from the application 300 to the control application 110. Then, color sample matching for generating an input profile that facilitates color conversion to bring color of a printed matter to be printed based on the job data closer to the color represented by the DCP is performed (step S37). On the other hand, in a case where the color difference is smaller than the target color difference, which means that the target color difference has been achieved, the screen illustrated in FIG. 16B transitions to a screen illustrated in FIG. 16C to be described later. In this case, color sample matching (generating an input profile) is not performed.

Step S38

The print control unit 116 transmits the input profile generated by the color matching unit 115 to the printer 20 to be used.

Step S39

As described above, when the operator of the printing company presses the start button 1609 on the job control screen 1600, for example, the web browser 120 displays a print determination screen 1700 illustrated in FIG. 16A.

The print determination screen 1700 illustrated in FIG. 16A is a screen for causing to perform the printing processing for the selected job data using the generated input profile. As illustrated in FIG. 16A, the print determination screen 1700 includes a printer selection field 1701, a sheet type selection field 1702, a print button 1711, a cancel button 1712, a document file display area 1741, a DCP display area 1742, and a read image display area 1743.

The printer selection field 1701 is a field for selecting a printer (printer 20) that performs printing processing for job data from a plurality of printers held by the print shop. The sheet type selection field 1702 is a field for selecting a sheet type of a recording medium used for printing processing performed by the printer 20. The print button 1711 is a button for causing the printer 20 selected in the printer selection field 1701 to perform printing processing using the generated input profile. The print button 1711 may be enabled at the time of generation of an input profile. The cancel button 1712 is a button for returning to the job control screen 1600. The document file display area 1741 is an area for displaying an image of a document file included in the job data selected on the job selection screen 1500. The DCP display area 1742 is an area for displaying a DCP corresponding to the selected job data as an image. The read image display area 1743 is an area for displaying a second read image. Note that, in the read image display area 1743, a first read image is displayed when a first printed matter is read, and a second read image is displayed when a second printed matter is read.

When the operator of the printing company presses the print button 1711 on the print determination screen 1700, the web browser 120 transmits a print instruction to perform printing processing for job data using an input profile generated by the color sample matching to the cloud system 30. The first registration unit 301 of the cloud system 30 acquires the print instruction via the web UI 320. When the print instruction is acquired by the first registration unit 301, the print management unit 305 transmits, to the image reading system 10 via the communication unit 308, the print instruction to perform printing processing for the job data acquired in step S30 using the generated input profile. Note that the processing of step S39 may be skipped, and the processing of steps S37, S38, S40, and S41 is continuously performed in response to the operation of pressing the adjust/reprint button 1751 that instructs adjustment and reprint in FIG. 16B. Then, the screen transitions to the screen illustrated in FIG. 16B at the time of completion of the printing processing in step S41, and then the state transitions to an operation waiting state in which the processing of step S42 is performed (pressing the read button 1721 in FIG. 16B).

Steps S40 and S41

In response to receiving the print instruction to perform printing processing for the job data using the generated input profile via the communication unit 111, the print control unit 116 causes the printer 20 to perform printing processing for the job data using the input profile transmitted in step S38.

Step S42

As described above, when the operator of the printing company presses the print button 1711 on the print determination screen 1700, for example, the web browser 120 displays the print determination screen 1700 illustrated in FIG. 16B.

The print determination screen 1700 illustrated in FIG. 16B is a screen for causing to perform reading processing on the printed matter of the job data printed using the generated input profile. As illustrated in FIG. 16B, the print determination screen 1700 includes a read button 1721, a cancel button 1722, the document file display area 1741, the DCP display area 1742, and the read image display area 1743.

The read button 1721 is a button for causing the image reading system 10 to perform reading processing on the printed matter of the job data printed using the generated input profile. The cancel button 1722 is a button for returning to the print determination screen 1700 illustrated in FIG. 16A.

When the operator of the printing company presses the read button 1721 on the print determination screen 1700, the web browser 120 transmits, to the cloud system 30, a reading instruction to perform reading processing on the printed matter of the job data printed using the generated input profile. The first registration unit 301 of the cloud system 30 acquires the reading instruction via the web UI 320. When the reading instruction is acquired by the first registration unit 301, the print management unit 305 transmits the reading instruction to the image reading system 10 via the communication unit 308. In this case, the reading instruction also serves as an instruction to determine the print result.

Step S43

In response to receiving the reading instruction (instruction to determine the print result) via the communication unit 111, the image reading control unit 112 transmits, to the scanner 12, a reading instruction to perform reading processing on the printed matter (second printed matter) of the job data printed using the generated input profile.

Step S44

The operator (the operator of the printing company owning the print shop in this example) of the image reading system 10 sets the printed matter on the scanner 12 so that the printed matter of the job data printed using the generated input profile is read. Then, the scanner 12 performs reading processing on the printed matter, and transmits a read image (second read image) obtained by performing the reading processing on the printed matter to the control server 11. The image reading control unit 112 acquires the second read image from the scanner 12.

The printing processing for the job data using the existing input profile in step S30 to the reading processing of acquiring the first read image in step S35 may be performed in accordance with operations similar to the operations on the print determination screen 1700 illustrated in FIGS. 16A and 16B.

Step S45

As described above, when the operator of the printing company presses the read button 1721 on the print determination screen 1700, for example, the web browser 120 displays the print determination screen 1700 illustrated in FIG. 16C.

The print determination screen 1700 illustrated in FIG. 16C is a screen for displaying a determination result for the second read image. As illustrated in FIG. 16C, the print determination screen 1700 includes a close button 1731, the document file display area 1741, the DCP display area 1742, the read image display area 1743, a difference image display area 1744, and an average color difference display area 1745.

The close button 1731 is a button for returning to the job selection screen 1500 in FIG. 14. The difference image display area 1744 is an area for displaying a difference image between a second read image and a DCP. The average color difference display area 1745 is an area for displaying an average color difference ΔE between a second read image and a DCP.

The print result determination unit 117 of the control server 11 included in the image reading system 10 determines an average color difference ΔE or the like between the second read image acquired by the image reading control unit 112 and the DCP acquired in step S36. In addition, the print result determination unit 117 generates a difference image between the DCP and the second read image as a print result. As illustrated in FIG. 16C, the print result determination unit 117 displays the second read image in the read image display area 1743 on the print determination screen 1700. As illustrated in FIG. 16C, the print result determination unit 117 also displays the generated difference image in the difference image display area 1744 on the print determination screen 1700. As illustrated in FIG. 16C, the print result determination unit 117 further displays a calculated average color difference ΔE in the average color difference display area 1745 on the print determination screen 1700.

Furthermore, the print result determination unit 117 performs determination for the calculated average color difference ΔE. Specifically, the print result determination unit 117 determines, for example, whether the calculated average color difference ΔE is equal to or smaller than the target average color difference ΔE (average color difference ΔE displayed in the target color difference display field 1605 on the job control screen 1600).

The web browser 120 displays the determination result for the average color difference ΔE determined by the print result determination unit 117 in the read image display area 1743, the difference image in the difference image display area 1744, and the calculated average color difference ΔE in the average color difference display area 1745 on the print determination screen 1700. An example of the print determination screen 1700 illustrated in FIG. 16C indicates a case where the determination result indicates that the color difference is satisfactory. In a case where the determination result indicates that the color difference is not satisfactory, the web browser 120 displays the print determination screen 1700 illustrated in FIG. 17.

The print determination screen 1700 illustrated in FIG. 17 is a screen to be displayed in a case where a determination result for a second read image indicates that the color difference is not satisfactory. As illustrated in FIG. 17, the print determination screen 1700 includes the adjust/reprint button 1751, a cancel button 1752, the document file display area 1741, the DCP display area 1742, the read image display area 1743, the difference image display area 1744, and the average color difference display area 1745.

The adjust/reprint button 1751 is a button for causing the printer 20 to perform the printing processing again using an adjusted input profile after the settings of the printer 20 are adjusted and the generated input profile is adjusted. The cancel button 1752 is a button for returning to the job selection screen 1500 in FIG. 14.

When the operator of the printing company presses the adjust/reprint button 1751 on the print determination screen 1700, the web browser 120 transmits, to the cloud system 30, a print instruction to perform the printing processing again for the job data using the adjusted input profile. The subsequent processing is similar to the processing performed in FIGS. 16B and 16C.

Step S46

In a case where the determination result determined by the print result determination unit 117 indicates that the color difference is satisfactory, the print result determination unit 117 transmits a print result including the determination result and the difference image to the cloud system 30 via the communication unit 111. When the determination result indicates that the color difference is satisfactory, the print button 1610 on the job control screen 1600 is enabled. Thus, actual printing processing using the generated input profile (or adjusted input profile), that is, the printing processing of the printed matter (third printed matter) for delivery to the brand owner can be performed.

Step S47

In response to receiving the print result and the difference image from the image reading system 10 via the communication unit 308, the report creation unit 307 of the cloud system 30 creates a print report 1800 including the determination result included in the print result and the difference image as illustrated in FIG. 18. In the example of the print report 1800 illustrated in FIG. 18, the name of a print job, the print date, the name of a printer that has performed the printing processing, the color matching method, the color target (such as a reference page of a print sample), the difference image, the average color difference ΔE, and a special note on the quality are included in the print report.

Steps S48 and S49

The report creation unit 307 registers (stores) the print report 1800 in the storage unit 310.

The color adjustment system 1 performs the color adjustment processing along the steps S11 to S49 described above. In a case where the printing company or the intermediary company selects and duplicates job data on the job selection screen 1500 illustrated in FIG. 14 and color sample matching and printing processing are performed at another print site or by another printer, the processing of steps S28 to S49 are performed. When the color sample matching is completed and only the actual printing processing is required, only the processing of steps S39 to S49 may be performed.

As described above, the color adjustment system 1 according to the present embodiment includes the first registration unit 301, the DCP registration unit 304a, the print control unit 116, the image reading control unit 112, and the color matching unit 115. The first registration unit 301 registers job data including a document file to be printed in the storage unit 310. The DCP registration unit 304a registers a DCP as a color sample in the storage unit 310 in association with the job data. The print control unit 116 causes the printer 20 to print out the document file included in the job data as a first printed matter. The image reading control unit 112 causes the scanner 12 to perform reading processing on the first printed matter to acquire the read image as a first read image. The color matching unit 115 generates, based on the first read image and the DCP, an input profile that facilitates color conversion to bring color of a printed matter closer to the color represented by the DCP. Accordingly, the DCP that is color sample data is centrally managed in the storage unit 310 (the cloud system 30) and the DCP can be shared by individual print sites. Thus, color consistency (consistency of quality) can be ensured at multiple sites, choices of print sites to be requested to perform printing processing increase, and color sample matching at individual print sites and for individual printers can be easily performed. For example, in a case where printing processing for the same job data (i.e., job data including the same document file) is performed at a plurality of print sites, color sample matching can be performed at each site using a shared DCP by accessing the cloud system 30 where the shared DCP is centrally managed in association with the job data. Thus, consistency of quality is ensured. In addition, since the shared DCP can be easily used for the same job data at each print site, an orderer (brand owner or the like) of print processing can, for example, selectively request the print processing to a print site B having a room in the operating state of the printers, instead of the print site A having no room in the operating state of the printers. Thus, choices of print sites increase.

First Modification

A description is given of a color adjustment system according to a first modification, focusing on differences from the color adjustment system 1 according to the above-described embodiment. In the above-described embodiment, the configuration and the operations of the image reading system 10 to perform the color sample matching for generating an input profile and the determination for the second read image are described. In the present modification, a description is given of a configuration and operations of a cloud system to perform the color sample matching and the determination. The overall configuration of the color adjustment system and the hardware configurations of a printer, a control server, and the cloud system according to the present modification are similar to those described in the above-described embodiment.

Figure 19:
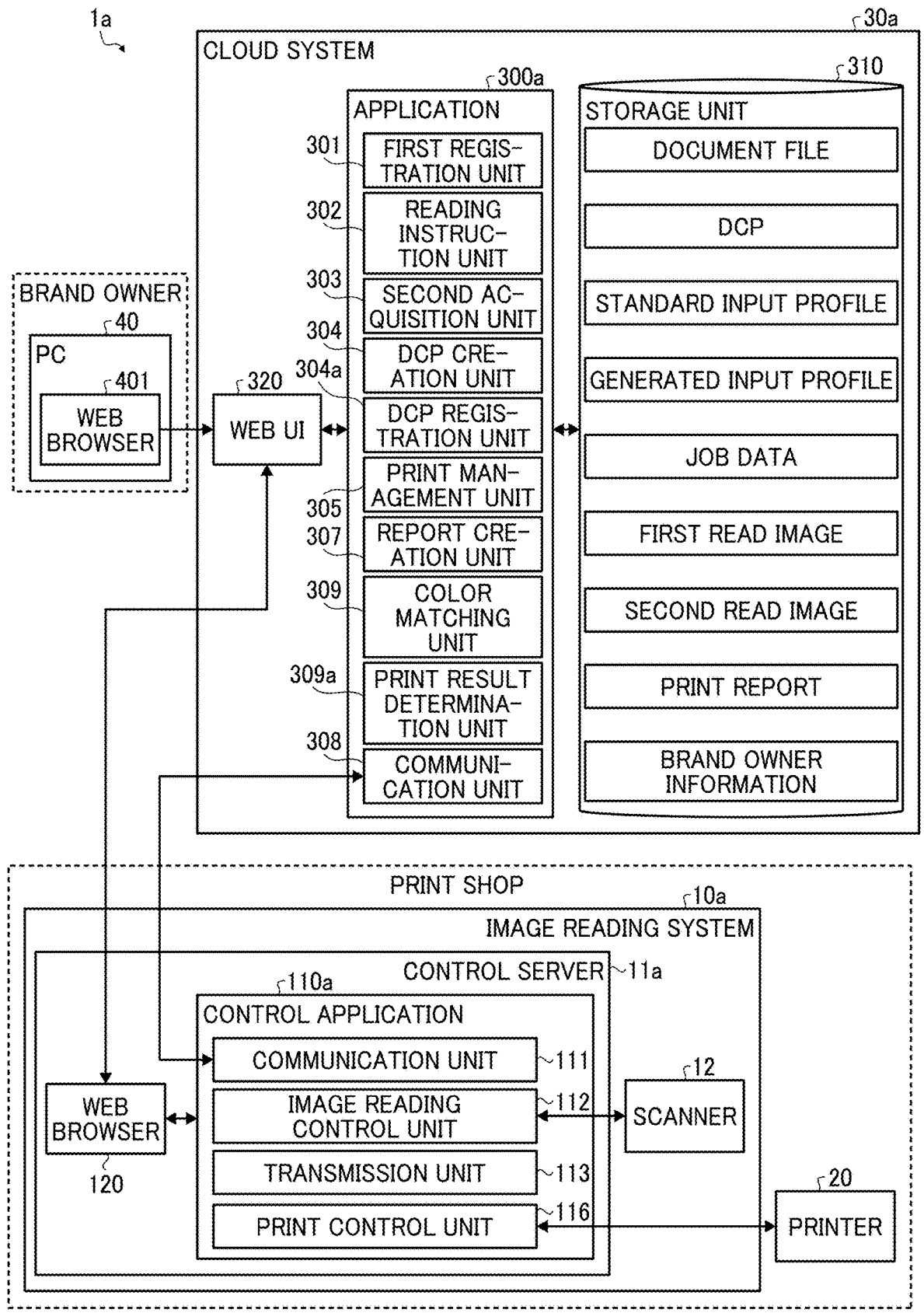
FIG. 19 is a block diagram illustrating an example of a functional configuration of a color adjustment system according to a first modification of the embodiment of the present disclosure.

FIG. 19 is a block diagram illustrating an example of a functional configuration of a color adjustment system according to the first modification of the present embodiment. A description is given of the functional configuration and operation of a color adjustment system 1a according to the present modification, with reference to FIG. 19.

As illustrated in FIG. 19, the color adjustment system 1a according to the present modification includes an image reading system 10a (reading system), the printer 20 (printing apparatus), a cloud system 30a, and the PC 40. The image reading system 10a includes a control server 11a and the scanner 12 (reading apparatus).

As illustrated in FIG. 19, a control application 110a and the web browser 120 are installed in the control server 11a of the image reading system 10a as software for implementing individual functions. The control server 11a includes the communication unit 111, the image reading control unit 112 (reading control unit), the transmission unit 113, and the print control unit 116 as functional units implemented when the control application 110a is executed by the CPU 601. The operations of these functional units are basically the same as those of the above-described embodiment, and different operations are described below.

The transmission unit 113 transmits not only the print sample read image but also the first read image and the second read image acquired by the image reading control unit 112 to the cloud system 30a via the communication unit 111.

At least a part of functional units among the functional units illustrated in FIG. 19 implemented by the control application 110a of the control server 11a being executed may be implemented by a hardware circuit such as an FPGA or an ASIC.

Further, each functional unit illustrated in FIG. 19 implemented by the control application 110a being executed is a conceptual representation of a function, and the functional configuration of the control application 110a is not limited thereto. For example, two or more of the functional units of the control application 110a illustrated as independent units in FIG. 19 may be integrated into a single functional unit. By contrast, a plurality of functions provided by one functional unit of the control application 110a illustrated in FIG. 19 may be divided and allocated to a plurality of functional units.

As illustrated in FIG. 19, an application 300a and the web UI 320 are installed in the cloud system 30a as software for implementing individual functions, and the storage unit 310 is included in the cloud system 30a. The cloud system 30a includes the first registration unit 301, the reading instruction unit 302, the second acquisition unit 303, the DCP creation unit 304 (first creation unit), the DCP registration unit 304a (an example of a second registration unit), the print management unit 305, the report creation unit 307 (second creation unit), the communication unit 308, a color matching unit 309 (an example of a generation unit), and a print result determination unit 309a as functional units implemented when the application 300a is executed by the CPU 601.

The color matching unit 309 is a functional unit that performs color matching for generating, based on the existing input profile, the first read image (first read image data) of the job data, and the DCP (color sample data) corresponding to the job data, an input profile that facilitates color conversion to bring color of a printed matter to be printed based on the job data closer to the color represented by the DCP. In this case, the color matching unit 309 acquires the first read image from the image reading system 10 via the communication unit 308. The color matching unit 309 transmits a generated input profile to the image reading system 10a via the communication unit 308.

The print result determination unit 309a is a functional unit that determines an average color difference ΔE between the second read image of the printed matter for which the input profile generated by the color matching unit 309 is used and the DCP, and outputs the determination result as a print result. In this case, the print result determination unit 309a acquires the second read image from the image reading system 10 via the communication unit 308. In addition, the print result determination unit 309a generates a difference image between the DCP and the second read image.

The report creation unit 307 creates a print report based on the print result output by the print result determination unit 309a. The report creation unit 307 registers (stores) the print report in the storage unit 310.

The operations of other functional units of the cloud system 30a are similar to those of the above-described embodiment.

At least a part of functional units among the functional units illustrated in FIG. 19 implemented by the application 300a of the cloud system 30a being executed may be implemented by a hardware circuit such as an FPGA or an ASIC.

Further, each functional unit illustrated in FIG. 19 implemented by the application 300a being executed is a conceptual representation of a function, and the functional configuration of the application 300a is not limited thereto. For example, two or more of the functional units of the application 300a illustrated as independent units in FIG. 19 may be integrated into a single functional unit. By contrast, a plurality of functions provided by one functional unit of the application 300a illustrated in FIG. 19 may be divided and allocated to a plurality of functional units.

As described above, the color adjustment system 1a according to the present modification provides the same effects as those of the color adjustment system 1 according to the above-described embodiment. In addition, since the cloud system 30a is configured to take over the functions of generating an input profile and performing determination for a print result that the control server 11 of the color adjustment system 1 has, the processing load of the image reading system 10a is reduced. Further, by leaving the processing of generating an input profile and performing determination to the cloud system 30a that has abundant resources, the processing speed increases.

Second Modification

A description is given of a color adjustment system according to a second modification, focusing on differences from the color adjustment system 1 according to the above-described embodiment. In the above-described embodiment, the operations have been described based on the assumption of a single image reading system that is the image reading system 10. In the present modification, based on the assumption of a plurality of image reading systems, a description is given of operations performed by a printing company that has received a job to transfer the job to another printing company, to allocate the job to printing companies or printers, or to duplicate the job data. The hardware configurations of a printer, a control server, and a cloud system according to the present modification are similar to those described in the above-described embodiment.

Functional Configuration of Color Adjustment System

Figure 20B:
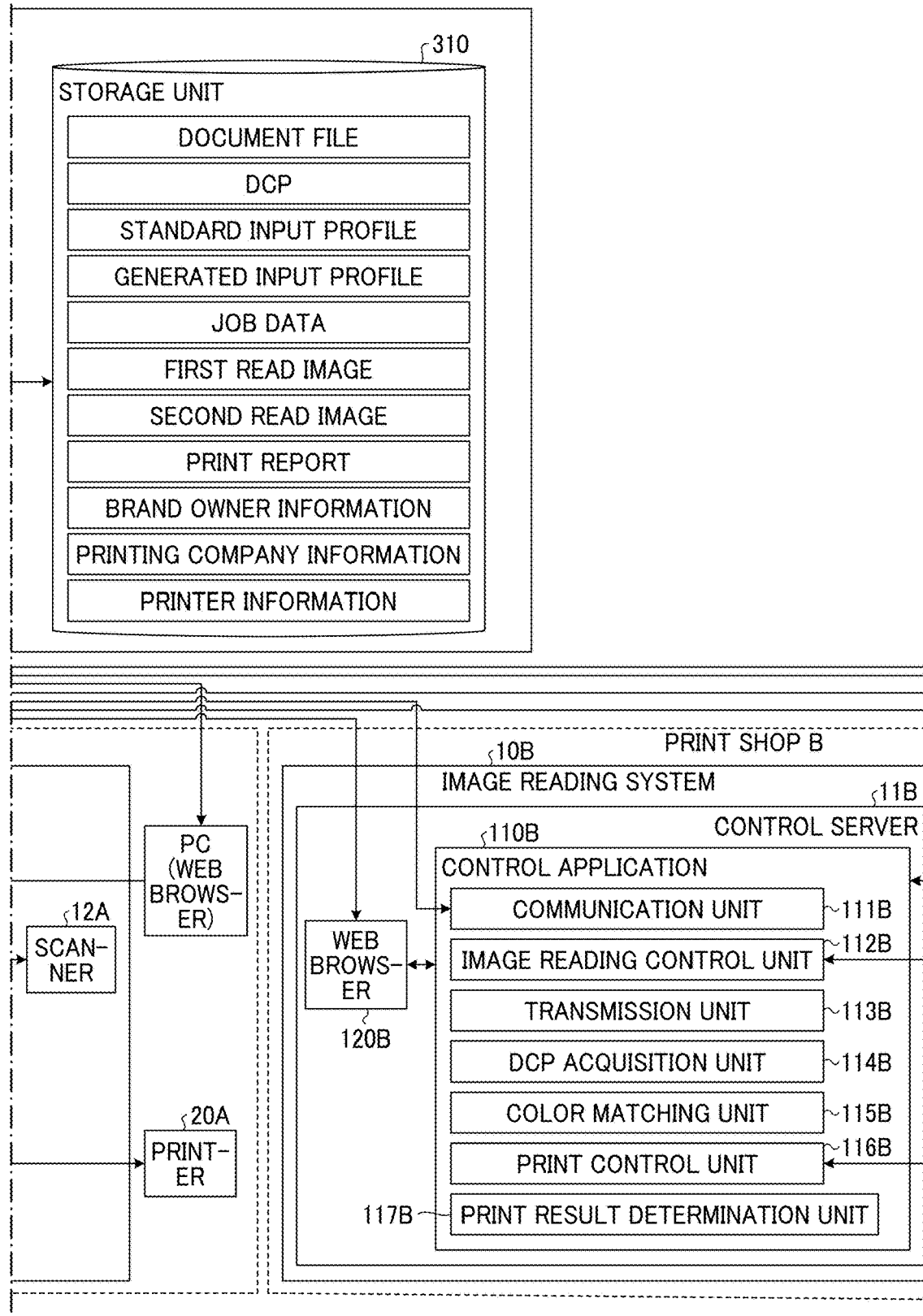
Figure 20C:
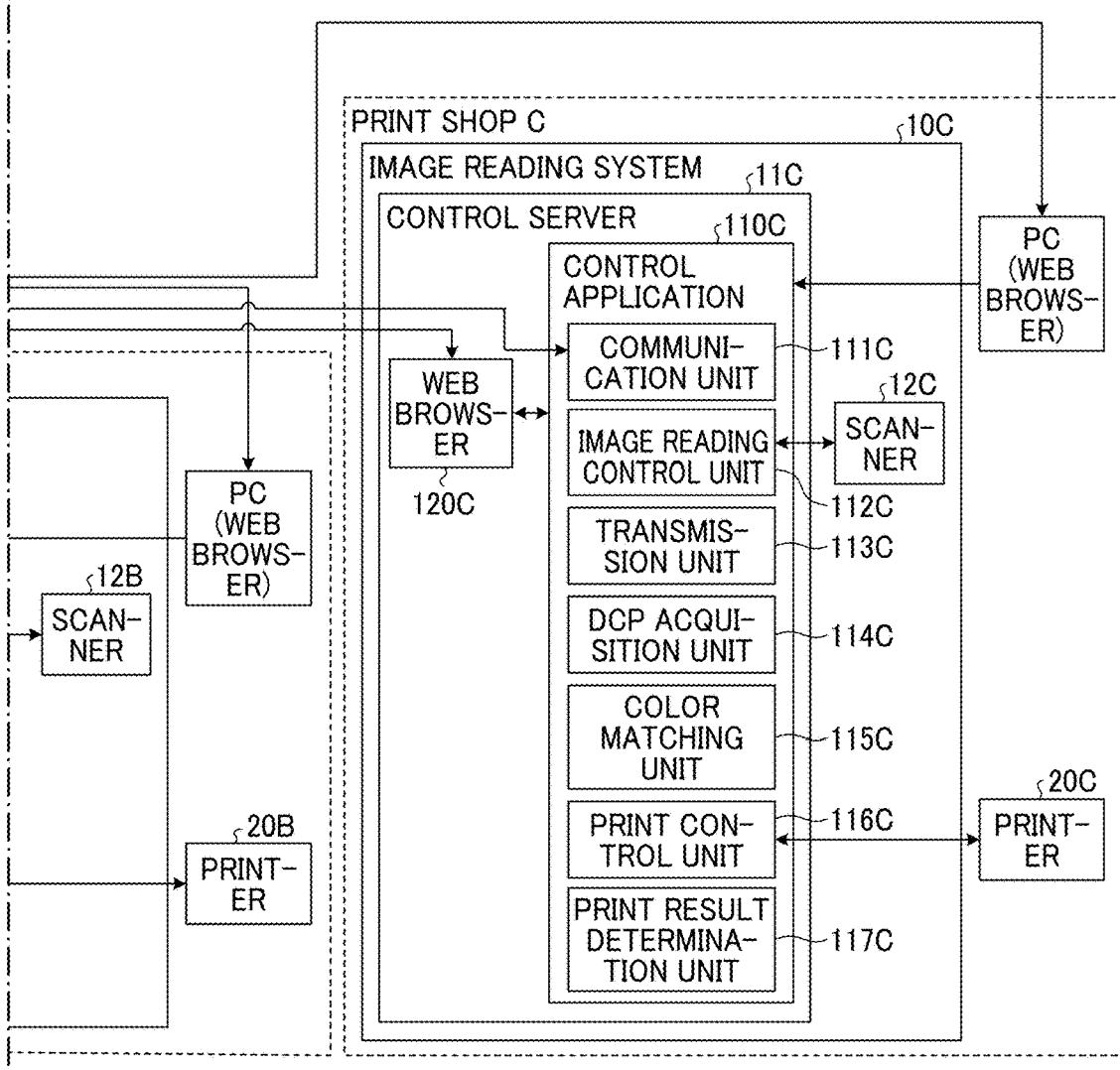

FIGS. 20A to 20C are block diagrams illustrating an example of a functional configuration of a color adjustment system according to a second modification of the embodiment. A description is given of the functional configuration of a color adjustment system 1b according to the present modification, with reference to FIGS. 20A to 20C.

As illustrated in FIGS. 20A to 20C, the color adjustment system 1b according to the present modification includes image reading systems 10A to 10C (reading systems), print-ers 20A to 20C (printing apparatuses), the cloud system 30, and the PC 40. In the configuration of the color adjustment system 1b illustrated in FIGS. 20A to 20C, the image reading systems 10A to 10C are communicable with the cloud system 30 and the PC 40 each other via the network N such as the Internet. The image reading systems 10A to 10C are respectively communicable with the printers 20A to 20C each other via a network such as a LAN. As illustrated in FIGS. 20A to 20C, the image reading system 10A and the printer 20A belong to a print shop A, the image reading system 10B and the printer 20B belong to a print shop B. and the image reading system 10C and the printer 20C belong to a print shop C. The functional configurations and operations of the cloud system 30 and the PC 40 are respectively similar to those of the cloud system 30 and the PC 40 of the color adjustment system 1 according to the above-described embodiment.

In the example of the color adjustment system 1b illustrated in FIGS. 20A to 20C, although the three print shops A to C are illustrated as print sites, the number of print sites is not limited to three, but may be two or four or more. In addition, although each print site holds one printer as illustrated in FIGS. 20A to 20C, the number of printers held by each print site is not limited to one, but may be more than one.

As illustrated in FIG. 20A, a control application 110A and the web browser 120A are installed in a control server 11A of the image reading system 10A as software for implementing individual functions. The control server 11A includes a communication unit 111A, an image reading control unit 112A (reading control unit), a transmission unit 113A, a DCP acquisition unit 114A, a color matching unit 115A (an example of a generation unit), a print control unit 116A, and a print result determination unit 117A (an example of a determination unit) as functional units implemented when the control application 110A is executed by the CPU 601. The operation of each functional unit of the control server 11A is similar to that of each functional unit of the control server 11 of the above-described embodiment. The operation of the web browser 120A is similar to that of the web browser 120 of the above-described embodiment.

As illustrated in FIG. 20B, a control application 110B and the web browser 120B are installed in a control server 11B of the image reading system 10B as software for implementing individual functions. The control server 11B includes a communication unit 111B, an image reading control unit 112B (reading control unit), a transmission unit 113B, a DCP acquisition unit 114B, a color matching unit 115B (an example of a generation unit), a print control unit 116B, and a print result determination unit 117B (an example of a determination unit) as functional units implemented when the control application 110B is executed by the CPU 601. The operation of each functional unit of the control server 11B is similar to that of each functional unit of the control server 11 of the above-described embodiment. The operation of the web browser 120B is similar to that of the web browser 120 of the above-described embodiment.

As illustrated in FIG. 20C, a control application 110C and the web browser 120C are installed in a control server 11C of the image reading system 10C as software for implementing individual functions. The control server 11C includes a communication unit 111C, an image reading control unit 112C (reading control unit), a transmission unit 113C, a DCP acquisition unit 114C, a color matching unit 115C (an example of a generation unit), a print control unit 116C, and a print result determination unit 117C (an example of a determination unit) as functional units implemented when the control application 110C is executed by the CPU 601. The operation of each functional unit of the control server 11C is similar to that of each functional unit of the control server 11 of the above-described embodiment. The operation of the web browser 120C is similar to that of the web browser 120 of the above-described embodiment.

The functional configurations of the image reading systems 10A to 10C, and the cloud system 30 of the color adjustment system 1b illustrated in FIG. 20 are respectively similar to the functional configurations of the image reading system 10 and the cloud system 30 of the color adjustment system 1 illustrated in FIG. 4, but are not limited thereto. For example, the functional configurations of the image reading systems 10A to 10C and the cloud system 30 of the color adjustment system 1b illustrated in FIG. 20 may be respectively similar to the functional configurations of the image reading system 10a and the cloud system 30a of the color adjustment system 1a illustrated in FIG. 19.

Main Part of Color Adjustment Processing Performed by Color Adjustment System

Figure 21:
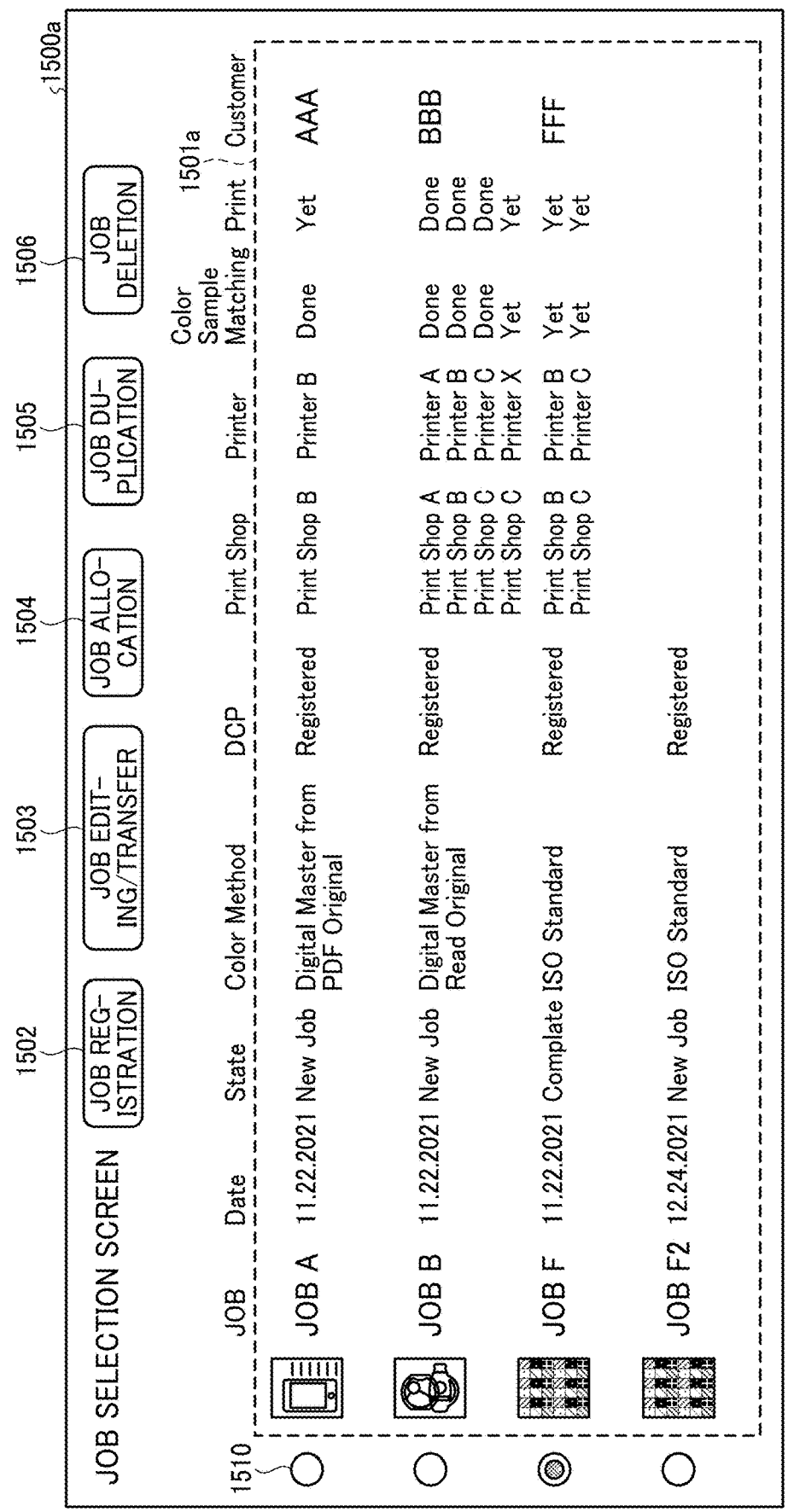
FIG. 21 is a diagram illustrating an example of a job selection screen according to the second modification of the embodiment of the present disclosure.
Figure 22:
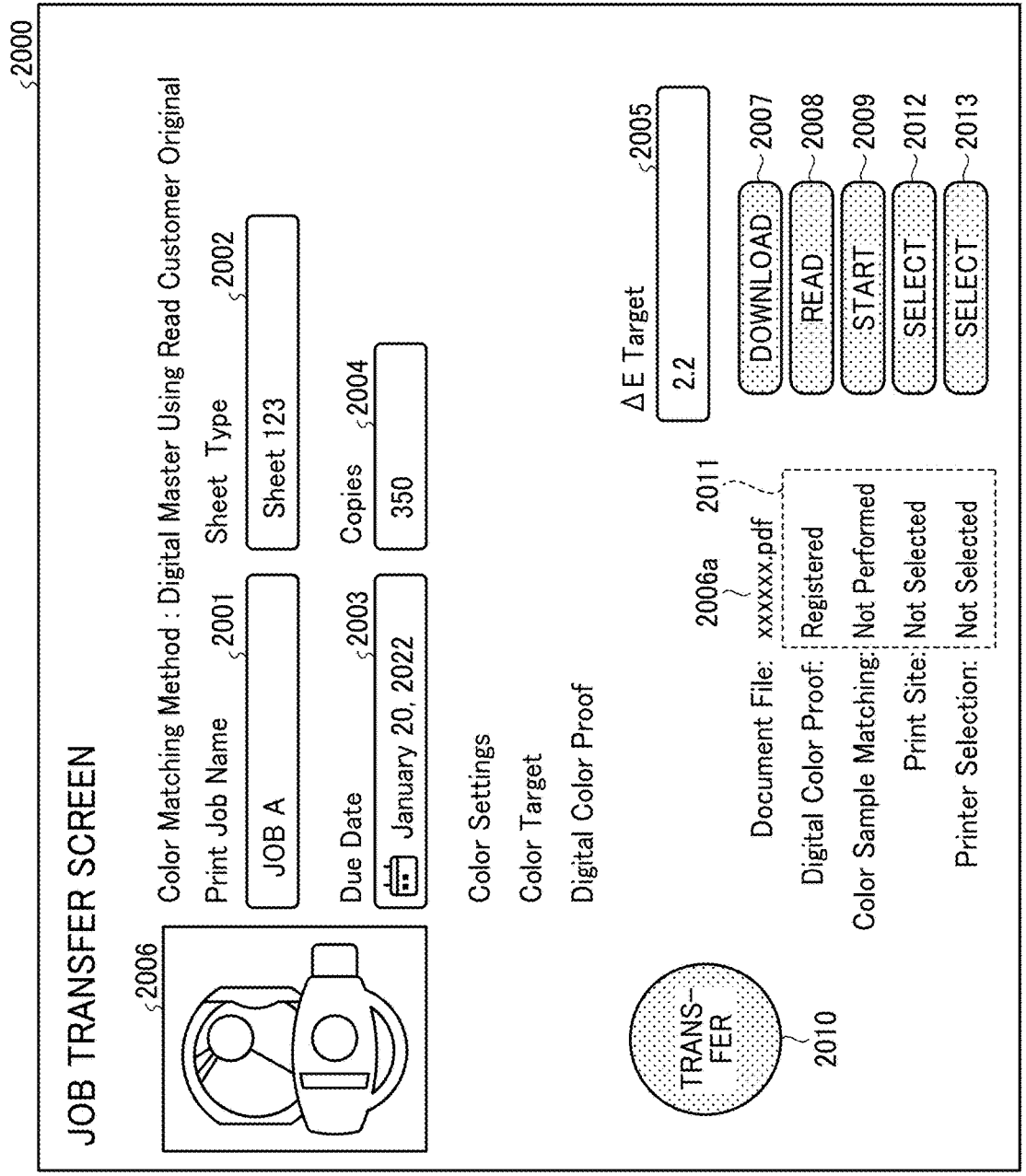
FIG. 22 is a diagram illustrating an example of a job transfer screen according to the second modification of the embodiment of the present disclosure.
Figure 23:
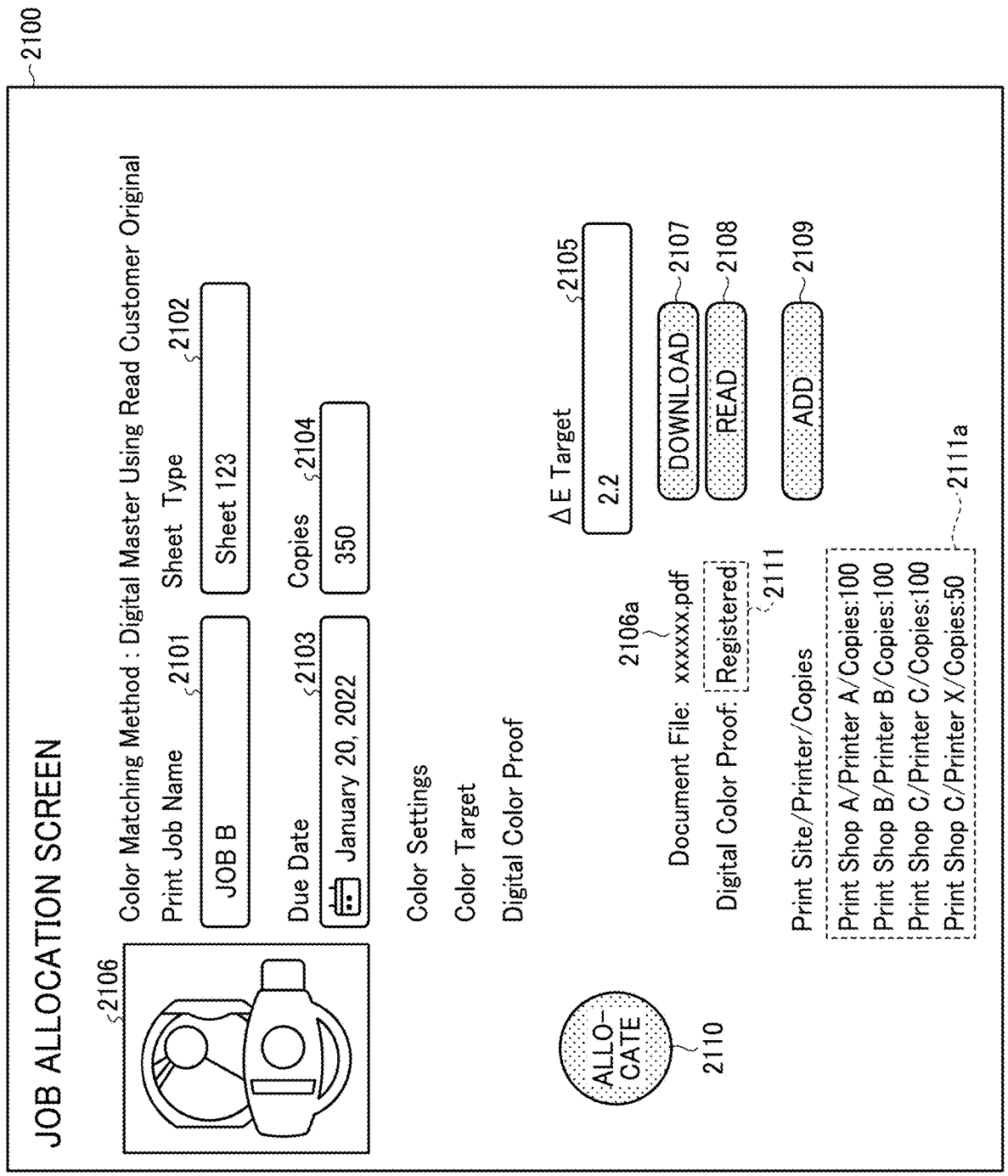
FIG. 23 is a diagram illustrating an example of a job allocation screen according to the second modification of the embodiment of the present disclosure.
Figure 25:
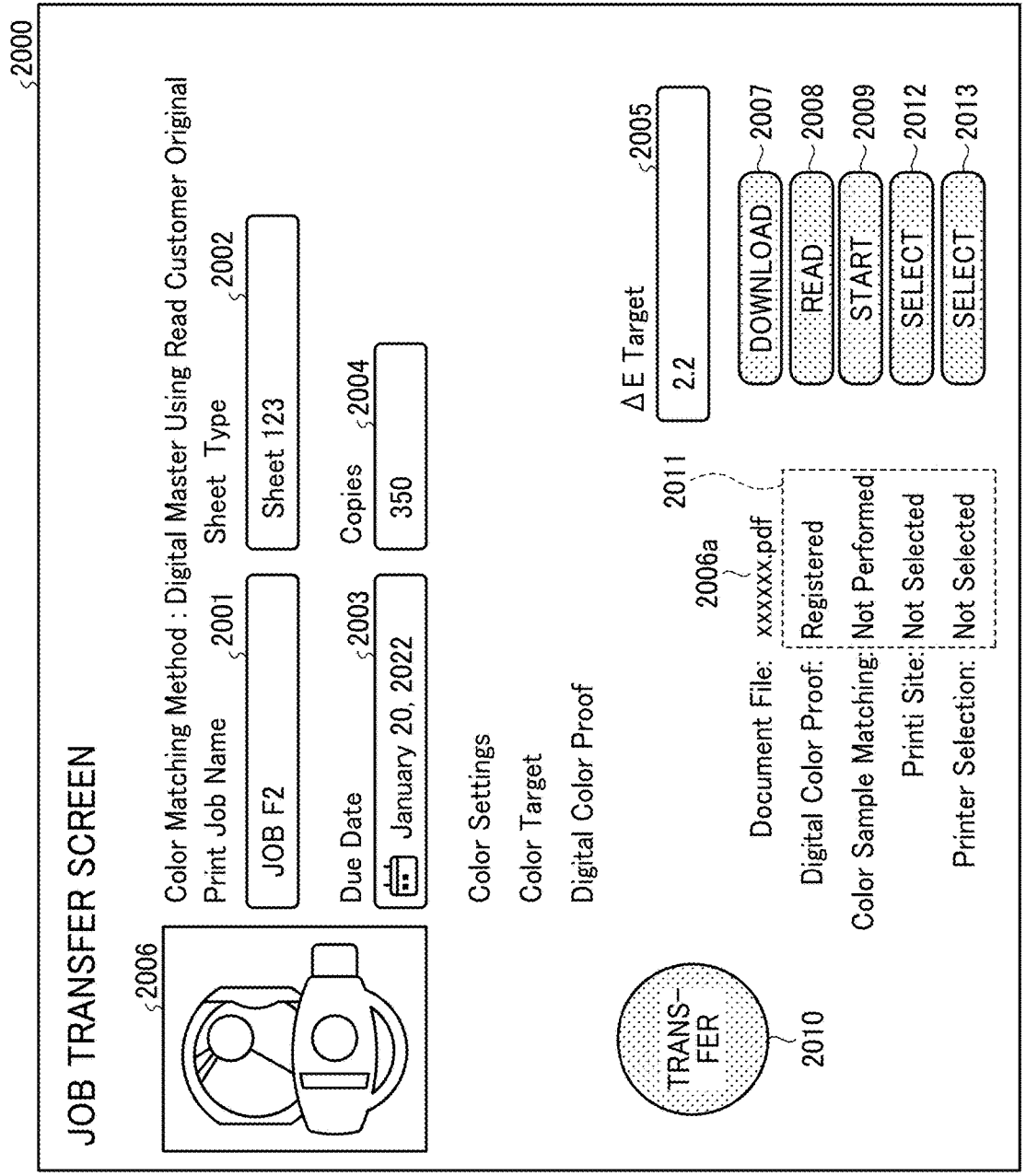
FIG. 25 is a diagram illustrating an example of the job transfer screen transitioned from the job duplication screen according to the second modification of the embodiment of the present disclosure.

FIG. 21 is a diagram illustrating an example of a job selection screen according to the second modification of the embodiment. FIG. 22 is a diagram illustrating an example of a job transfer screen according to the second modification of the embodiment. FIG. 23 is a diagram illustrating an example of a job allocation screen according to the second modification of the embodiment. FIG. 24 is a diagram illustrating an example of a job duplication screen according to the second modification of the embodiment. FIG. 25 is a diagram illustrating an example of the job transfer screen transitioned from the job duplication screen according to the second modification of the embodiment. A description is given of the color adjustment processing performed by the color adjustment system 1b according to the present modification, in particular, operations performed by a printing company that has received a job to transfer the job to another printing company, to allocate a part of the job to another printing company, and to duplicate job data, with reference to FIGS. 21 to 25 and FIG. 8.

In the present modification, it is assumed that the printing company that has received a job owns the print shop A. In step S28 of FIG. 8, the printing company owning the print shop A that has received the job performs an operation for selecting job data for which printing processing is requested to be performed via the web browser 120A of the control server 11A. Specifically, the operator of the printing company causes the web browser 120A to display a job selection screen 1500a illustrated in FIG. 21.

As illustrated in FIG. 21, the job selection screen 1500a includes a job list display area 1501a, a job registration button 1502, a job editing/transfer button 1503, a job allocation button 1504, a job duplication button 1505, a job deletion button 1506, and selection radio buttons 1510.

The job list display area 1501a is an area for displaying a list of jobs (specifically, a list of job data), among the job data registered in the cloud system 30, for which a printing request is assigned to the print shop (the print shop A in this example). Further, in addition to the items displayed in the job list display area 1501 illustrated in FIG. 14 described above, other items are displayed in the job list display area 1501a. The other items are, for example, whether a DCP has been registered, whether a job has been transferred or allocated to another print shop ("Print Shop"), whether a job has been transferred or allocated to another printer ("Printer"), whether color sample matching has been performed, and whether printing processing has been performed. As illustrated in FIG. 21, in the job list display area 1501a, not only job data assigned to the print shop (print shop A in this example) but also a list of job data assigned or allocated to other print sites and duplicated are displayed.

The job registration button 1502 is a button for registering job data received by the print shop (print shop A in this example) as a separate request. The processing performed when the job registration button 1502 is pressed conforms to the processing of the job registration screen 1100 in FIG. 10 described above.

The job editing/transfer button 1503 is a button for editing a piece of job data selected by the selection radio button 1510 from the pieces of job data already registered, or for transferring a job corresponding to a piece of job data selected by the selection radio button 1510 from the pieces of job data already registered to another print site or another printer. The processing performed when the job editing/transfer button 1503 is pressed will be described in detail with reference to FIG. 22.

The job allocation button 1504 is a button for allocating a job selected by the selection radio button 1510 from the jobs already registered to individual print sites or to individual printers at each print site. The processing performed when the job allocation button 1504 is pressed will be described in detail with reference to FIG. 23.

The job duplication button 1505 is a button for duplicating a piece of job data selected by the selection radio button 1510 from the pieces of job data already registered to transfer the duplicated job data to another print site or another printer. The processing performed when the job duplication button 1505 is pressed will be described in detail with reference to FIGS. 24 to 25.

The job deletion button 1506 is a button for deleting a piece of job data selected by the selection radio button 1510 from the pieces of job data already registered.

The selection radio button 1510 is a radio button for selecting a piece of job data from the pieces of job data already registered.

Processing of Job Transfer

When the operator of the printing company owning the print shop A presses the job editing/transfer button 1503 in a state where a desired piece of job data is selected by the selection radio button 1510 from the already registered pieces of job data displayed on the job selection screen 1500a, the web browser 120A displays a job transfer screen 2000 (an example of a print request destination selection screen) illustrated in FIG. 22.

The job transfer screen 2000 is a screen for editing a selected piece of job data from the already registered pieces of job data, or for transferring a job corresponding to a selected piece of job data from the already registered pieces of job data to another print site or another printer. As illustrated in FIG. 22, the job transfer screen 2000 includes a job name display field 2001, a sheet type selection field 2002, a due date display field 2003, a number of copies display field 2004, a target color difference display field 2005, a document file display area 2006, a document file name display section 2006a, a download button 2007, a read button 2008, a start button 2009, a transfer button 2010, a status display area 2011, a site select button 2012, and a printer select button 2013.

The job name display field 2001 is a field for displaying the name of the selected job data, which corresponds to the job name input field 1101 of the job registration screen 1100. The sheet type selection field 2002 is a field for designating a type of a recording medium (sheet type such as thin sheet or thick sheet, or a sheet feeding tray storing a specific type of sheet) used for printing a document file included in the selected job data. The due date display field 2003 is a field for displaying the due date of delivery of the printed matter of the selected job data, and corresponds to the due date input field 1108 of the job registration screen 1100. The number of copies display field 2004 is a field for displaying the number of copies to be printed for the document file included in the selected job data, and corresponds to the number of copies input field 1103 of the job registration screen 1100. The target color difference display field 2005 is a field for displaying the target average color difference ΔE in comparison with the DCP corresponding to the selected job data, and corresponds to the target color difference input field 1107 of the job registration screen 1100. The content displayed in each of the above-described display field may be editable for transferring the job data.

The functions of the document file display area 2006, the document file name display section 2006a, the download button 2007, the read button 2008, and the start button 2009 are respectively similar to those of the document file display area 1606, the document file name display section 1606a, the download button 1607, the read button 1608, and the start button 1609 on the job control screen 1600 illustrated in FIG. 15.

The site select button 2012 is a button for selecting another print site to which job data having a job name of "JOB A" displayed on the job transfer screen 2000 is to be transferred. For example, the operator of the printing company owing the print shop A that has received the job can select another print site as a transfer destination by operating the site select button 2012. The example of FIG. 21 illustrates a state where a print shop B ("Shop B") which is another print site is selected as a transfer destination of the job data having the job name of "JOB A." Note that the own site (the print shop A in this example) may be selectable by the site select button 2012.

The printer select button 2013 is a button for selecting a printer to which the job data having the job name of "JOB A" displayed on the job transfer screen 2000 is to be transferred. In this case, printers held by a print site selected by the site select button 2012 are selectable by the printer select button 2013. The example of FIG. 21 illustrates a state where a printer B ("Printer B") held by the print shop B ("Shop B") is selected as a transfer destination of the job data having the job name of "JOB A." Note that printers held by the own site (the print shop A in this example) may be selectable by the printer select button 2013.

The status display area 2011 is an area for displaying various statuses indicating such as whether a DCP has been registered, whether color sample matching has been performed, whether a print site to which a job is transferred has been selected, and whether a printer to which the job is transferred has been selected. In the example illustrated in FIG. 22, the status display area 2011 presents that the DCP has been registered, the color sample matching has not been performed, the print site to which the job is transferred has not been selected, and the printer to which the job is transferred has not been selected.

The transfer button 2010 is a button for setting a printer selected by operation of the printer select button 2013 of a print site selected by operation of the site select button 2012 as a transfer destination of a job. When the transfer button 2010 is pressed, the web browser 120A associates the print site selected by the operation of the site select button 2012 and the printer selected by the operation of the printer select button 2013 with the job data (job data already registered in the storage unit 310) displayed on the job transfer screen 2000, and transmits the associated pieces of information to the web UI 320. The first registration unit 301 of the cloud system 30 acquires the associated pieces of information via the web UI 320, and updates the contents of the registration in the storage unit 310. In this case, the web browser 120A may notify a PC or the like held by the print site selected by the site select button 2012 that the selected print site has been set as a transfer destination of a job.

The printing company owning the print shop (for example, the printing company owning the print shop B) set as the transfer destination of the job can perform a series of processing units such as color sample matching, actual printing processing, and creating a print report in steps S28 to S49 using the DCP associated with the job data in the storage unit 310.

Processing of Job Allocation

When the operator of the printing company owning the print shop A presses the job allocation button 1504 in a state where a desired piece of job data (i.e., a desired job) is selected by the selection radio button 1510 from the already registered pieces of job data displayed on the job selection screen 1500a, the web browser 120A displays a job allocation screen 2100 (another example of a print request destination selection screen) illustrated in FIG. 23.

The job allocation screen 2100 is a screen for allocating a job selected from the already registered jobs to a plurality of print sites or to a plurality of printers at one or more print sites. As illustrated in FIG. 23, the job allocation screen 2100 includes a job name display field 2101, a sheet type selection field 2102, a due date display field 2103, a number of copies display field 2104, a target color difference display field 2105, a document file display area 2106, a document file name display section 2106a, a download button 2107, a read button 2108, an add allocation destination button 2109, an allocate button 2110, a status display section 2111, and an allocation destination display area 2111a.

The job name display field 2101 is a field for displaying the name of the selected job (job data), which corresponds to the job name input field 1101 of the job registration screen 1100. The sheet type selection field 2102 is a field for designating a type of a recording medium (sheet type such as thin sheet or thick sheet, or a sheet feeding tray storing a specific type of sheet) used for printing a document file included in the selected job data. The due date display field 2103 is a field for displaying the due date of delivery of the printed matter of the selected job data, and corresponds to the due date input field 1108 of the job registration screen 1100. The number of copies display field 2104 is a field for displaying the number of copies to be printed for the document file included in the selected job data, and corresponds to the number of copies input field 1103 of the job registration screen 1100. The target color difference display field 2105 is a field for displaying the target average color difference ΔE in comparison with the DCP corresponding to the selected job data, and corresponds to the target color difference input field 1107 of the job registration screen 1100. The content displayed in each of the above-described display field may be editable for transferring the job data.

The functions of the document file display area 2106, the document file name display section 2106a, the download button 2107, and the read button 2108 are respectively similar to those of the document file display area 1606, the document file name display section 1606a, the download button 1607, and the read button 1608 on the job control screen 1600 illustrated in FIG. 15.

The add allocation destination button 2109 is a button for selecting a print site and a printer to which the job (job data) having a job name of "JOB B" displayed on the job allocation screen 2100 is to be allocated, and for inputting the number of copies to be printed by the selected printer. For example, the operator of the printing company owning the print shop A that has received the job can select print sites and printers as allocation destinations and input the number of copies to be printed by each printer at each print site by operating the add allocation destination button 2109. The examples of FIGS. 21 and 23 illustrate a status where, for the job data having the job name of "JOB B," 100 copies are allocated to a printer ("Printer A") of the print shop A ("Print Shop A") corresponding to the item "Print Site," 100 copies are allocated to a printer ("Printer B") of the print shop B ("Print Shop B") corresponding to the item "Print Site." 100 copies are allocated to a printer ("Printer C") of a print shop C ("Print Shop C") corresponding to the item "Print Site," and 50 copies are allocated to a printer ("Printer X") of the print shop C ("Shop C").

The status display section 2111 is a section for displaying a status indicating whether a DCP has been registered. In the example illustrated in FIG. 23, the status display section 2111 presents that the DCP has been registered.

The allocation destination display area 2111a is an area for displaying print sites and printers selected by operation of the add allocation destination button 2109 as allocation destinations, and for displaying the number of copies to be printed by each printer at each print site input by operation of the add allocation destination button 2109.

The allocate button 2110 is a button for setting print sites and printers selected by operation of the add allocation destination button 2109 as allocation destinations, and for setting the number of copies to be printed by each printer at each print site input by operation of the add allocation destination button 2109. When the allocate button 2110 is pressed, the web browser 120A associates the print sites and the printers selected by the operation of the add allocation destination button 2109 and the number of copies to be printed by each printer at each print site input by the operation of the add allocation destination button 2109 with the job data (job data already registered in the storage unit 310) displayed on the job transfer screen 2000, and transmits the associated pieces of information to the web UI 320. The first registration unit 301 of the cloud system 30 acquires the associated pieces of information via the web UI 320, and updates the contents of the registration in the storage unit 310. In this case, the web browser 120A may notify a PC or the like held by each print site selected by the add allocation destination button 2109 that each selected print site has been set as an allocation destination of the job.

Each printing company owning the print site set as the allocation destination of the job can perform a series of processing units such as color sample matching, actual printing processing, and creating a print report in steps S28 to S49 using the DCP associated with the job data in the storage unit 310. As a result, the job can be shared among the print sites and the printers set as the allocation destinations to be executed. In the job list display area 1501a of the job selection screen 1500a, the set number of copies and the number of copies already printed or the ratio of the number of copies already printed to the set number of copies may be displayed for each printer at each print site set as the allocation destination.

Processing of Job Duplication

When the operator of the printing company owning the print shop A presses the job duplication button 1505 in a state where a desired piece of job data is selected by the selection radio button 1510 from the already registered pieces of job data displayed on the job selection screen 1500a, the web browser 120A displays a job duplication screen 2200 illustrated in FIG. 24.

The job duplication screen 2200 is a screen for duplicating a selected piece of job data from the already registered pieces of job data. As illustrated in FIG. 24, the job duplication screen 2200 includes a job name input field 2201, a document file designation field 2202, a number of copies input field 2203, a standard selection section 2204, a standard profile designation field 2205, a DCP creation selection section 2206, a target color difference input field 2207, a due date input field 2208, a next button 2211, and a cancel button 2212.

The job name input field 2201 is an input field for setting a name of job data to be duplicated. The document file designation field 2202 is a field for selectively designating a document file, such as a PDF file, subjected to duplication. The number of copies input field 2203 is an input field for setting the number of copies to be printed for the document file included in the duplicated job data. The standard selection section 2204 is a radio button for selecting use of an input profile (standard input profile) of the standard of ISO without creating a DCP. The standard profile designation field 2205 is a field for selectively designating a standard input profile when the standard selection section 2204 is selected. The DCP creation selection section 2206 is a radio button for selecting creation of a DCP. The target color difference input field 2207 is an input field for setting a target average color difference ΔE in comparison with the DCP. The due date input field 2208 is an input field for setting a due date for delivery of a printed matter of the duplicated job data. The next button 2211 is a button for transitioning to the job transfer screen 2000 illustrated in FIG. 25. The cancel button 2212 is a button for canceling the settings input on the job duplication screen 2200 and returning to the job selection screen 1500a.

The settings of the job data selected on the job selection screen 1500a may be automatically set and displayed in each input field and each selection section on the job duplication screen 2200. Note that the number of copies input field 2203 and the due date input field 2208 on the job duplicate screen 2200 may be displayed in a state where the settings are not automatically set but no settings are set, and settings may be newly set for the duplicate job data.

When the next button 2211 is pressed, the web browser 120A displays the job transfer screen 2000 (an example of a print request destination selection screen) illustrated in FIG. 25.

The job transfer screen 2000 is a screen for transferring job data subjected to duplication to another print site or another printer. The configuration of the job transfer screen 2000 illustrated in FIG. 25 is similar to that of the job transfer screen 2000 illustrated in FIG. 22. In the job name display field 2001, the sheet type selection field 2002, the due date display field 2003, the number of copies display field 2004, and the target color difference display field 2005, the values set in the job name input field 2201, a sheet type selection area, the due date input field 2208, the number of copies input field 2203, and the target color difference input field 2207 on the job duplicate screen 2200 illustrated in FIG. 24 are displayed respectively. The document file included in the job data selected on the job selection screen 1500a is assigned to the document file name display section 2006a. The DCP associated with the job data selected on the job selection screen 1500a is assigned to the section of the DCP displayed in the status display area 2011. In the section of the print site to be displayed in the status display area 2011, a print site where the job selection screen 1500a is opened may be automatically set, or the print site originally set for the job data selected on the job selection screen 1500a may be automatically set. The example of FIG. 25 illustrates a case where job data having a job name of "JOB F" is duplicated as a job name of "JOB F2."

When the transfer button 2010 is pressed, the web browser 120A (an example of a duplication unit) duplicates the job data (first job data) originally selected on the job selection screen 1500a according to the contents of the settings set on the job transfer screen 2000 illustrated in FIG. 25 to newly create job data (second job data) as duplicated job data. Further, the web browser 120A associates the DCP displayed in the status display area 2011, the print site selected by the operation of the site select button 2012, and the printer selected by the operation of the printer select button 2013 with the duplicated job data, and transmits the associated pieces of information to the web UI 320. The first registration unit 301 of the cloud system 30 acquires the associated pieces of information via the web UI 320, and updates the contents of the registration in the storage unit 310. In this case, the web browser 120A may notify a PC or the like held by the print site selected by the site select button 2012 that the selected print site has been set as a transfer destination of the job data.

The settings for duplicating job data on the job duplication screen 2200 illustrated in FIG. 24 and the settings for transferring job data on the job transfer screen 2000 illustrated in FIG. 25 can be set for the purpose of additional printing or reprinting even after the printing processing for the job data (job data having the job name of "JOB F") originally selected is completed.

The printing company owning the print site set as the transfer destination of the duplicated job can perform a series of processing units such as color sample matching, actual printing processing, and creating a print report in steps S28 to S49 using the DCP associated with the duplicated job in the storage unit 310.

As described above, in the color adjustment system 1b according to the present modification, the cloud system 30 is installed with the web UI 320 that provides a terminal apparatus with another piece of information on a screen and causes the terminal apparatus to display the screen. The another piece of information on a screen represents screens such as the job selection screen 1500a for selecting job data from a list of job data, and the job transfer screen 2000 and the job allocation screen 2100 for selecting print sites and a printer for each print site as a print request destination for a document file included in the job data selected on the job selection screen 1500a. As a result, a job corresponding to registered job data can be transferred to a printer at another print site or can be allocated to printers at one or more print sites. For example, when the capacity of printing at a print site scheduled to perform printing processing for a job is reduced or disabled for some reason, the job can be transferred to another print site or a part of the job can be allocated to another print site. Thus, flexibility in printing processing is provided.

Further, the color adjustment system 1b according to the present modification includes the duplication units (web browsers 120A to 120C, etc.), the generation units (color matching units 115A to 115C, color matching unit 309, etc.), and the print control units (print control units 116A to 116C). Each of the duplication units duplicates first job data that is job data selected on the job selection screen 1500a to generate second job data. Each of the generation units updates an input profile for the second job data using color sample data associated with the first job data. Each of the print control units causes each of the printers (printers 20A to 20C) selected on the print request destination selection screen to perform printing processing for the second job data using the input profile updated by each of the generation units. As a result, for example, even after printing processing for job data originally selected is completed, additional printing or reprinting for the job data can be performed.

Note that, in a case where at least a portion of the functional units of the control servers 11 and 11a and the cloud systems 30 and 30a according to the above-described embodiment and first modification is implemented by execution of a computer program, the program can be prestored in a ROM or the like. The programs to be executed by the control servers 11 and 11a and the cloud systems 30 and 30a according to the above-described embodiment and first modification may be configured to be recorded in any computer-readable recording medium, such as a compact disc read only memory (CD-ROM), a flexible disk (FD), a compact disc recordable (CD-R), or a DVD, in an installable or executable file format and provided as computer program products. In addition, the programs to be executed by the control servers 11 and 11a and the cloud systems 30 and 30a according to the above-described embodiment and first modification may be configured to be stored in a computer connected to a network such as the Internet and provided by being downloaded via the network. Further, the programs to be executed by the control servers 11 and 11a and the cloud systems 30 and 30a according to the above-described embodiment and first modification may be configured to be provided or distributed via a network such as the Internet. The programs to be executed by the control servers 11 and 11a and the cloud systems 30 and 30a according to the above-described embodiment and first modification have module structure including at least one of the above-described functional units. Regarding the actual hardware related to the programs, the CPU 601 reads and executes the programs from the memory (e.g., the auxiliary memory 605) to load the programs onto the main memory to implement the above-described functional units.

Aspects of the present disclosure are, for example, as follows.

In Aspect 1, a color adjustment system includes a first registration unit that registers job data for requesting printing a document file in a storage unit, a second registration unit that registers color sample data associated with the job data in the storage unit, a print control unit that causes a printing apparatus to print out the document file corresponding to the job data as a first printed matter, a reading control unit that causes a reading apparatus to read the first printed matter to acquire first read image data, and a generation unit that generates an input profile based on the first read image data and the color sample data.

In Aspect 2, the color adjustment system according to Aspect 1, wherein the input profile is for color conversion to bring color of the first printed matter of the document file closer to color represented by the color sample data.

In Aspect 3, the color adjustment system according to Aspect 1, wherein the reading control unit causes the reading apparatus to read a print sample to acquire print sample read image data and the color adjustment system further includes a first creation unit that creates the color sample data based on the print sample read image data.

In Aspect 4, the color adjustment system according to Aspect 1 further includes a first creation unit creates the color sample data based on the document file and a color conversion rule.

In Aspect 5, the color adjustment system according to Aspect 4 further includes a first reception unit that receives designation of the color conversion rule in association with the job data registered by the first registration unit, and the first creation unit creates the color sample data based on the color conversion rule received by the first reception unit.

In Aspect 6, the color adjustment system according to any one of Aspects 3 to 5 further includes a second reception unit that receives selection of a creation method of the color sample data in association with the job data registered by the first registration unit, and the first creation unit creates the color sample data in accordance with the creation method received by the second reception unit.

In Aspect 7, the color adjustment system according to Aspect 6, wherein the second reception unit receives selection of a creation method that includes requesting reading of a print sample as the creation method, the reading control unit causes the reading apparatus to read the print sample set by a holder of the print sample to acquire the print sample read image in a case where the second reception unit receives the creation method that includes requesting reading of the print sample, and the first creation unit creates the color sample data based on the print sample read image data.

In Aspect 8, the color adjustment system according to Aspect 7, wherein the reading apparatus of Aspect 6 is the same as the reading apparatus of Aspect 1 or different from the reading apparatus of Aspect 1.

In Aspect 9, the color adjustment system according to Aspect 6 or 7, wherein the second reception unit receives designation of a reference page of the print sample to be read in response to receiving the selection of a creation method that includes reading the print sample as the creation method.

In Aspect 10, the color adjustment system according to any one of Aspects 1 to 9, wherein the print control unit causes the printing apparatus to print out the document file corresponding to the job data as the first printed matter using the input profile being a first input file and the generation unit updates the first input profile based on the first read image data and the color sample data to generate a second input profile as the input profile.

In Aspect 11, the color adjustment system according to any one of Aspects 1 to 9, wherein the print control unit causes the printing apparatus to print out the document file corresponding to the job data using the input profile as a second printed matter, the reading control unit causes the reading apparatus to read the second printed matter to acquire second read image data, and the color adjustment system further includes a determination unit that determines a color difference between the first read image data and the second read image data.

In Aspect 12, the color adjustment system according to Aspect 11 further includes a second creation unit that creates a print report including a determination result of color difference determined by the determination unit.

In Aspect 13, the color adjustment system according to Aspect 11 or 12, wherein the print control unit causes the printing apparatus to print out a third printed matter in a case where the determination result indicates that the color difference is satisfactory.

In Aspect 14, the color adjustment system according to any one of Aspects 1 to 13, wherein the print control unit applies the input profile to printing processing of a document file corresponding to job data different from the job data.

In Aspect 15, the color adjustment system according to any one of Aspects 1 to 14 includes a cloud system including the first registration unit, the second registration unit, and the storage unit, and a reading system including the reading control unit and the print control unit.

In Aspect 16, the color adjustment system according to Aspect 15, wherein the cloud system further includes a display control unit that provides a terminal apparatus with information on a screen and causes the terminal apparatus to display the screen, the information on a screen including information for displaying a visual representation, the visual representation receives an input by an operator to cause the cloud system to control the reading system to perform particular control, and the display control unit changes an appearance of the visual representation to indicate that the visual representation is inoperable in a case where a bidirectional communication between the cloud system and the reading system is not established.

In Aspect 17, the color adjustment system according to Aspect 15 or 16, wherein, in response to receiving an instruction to print by another printing apparatus, the document file corresponding to the job data and already printed by the printing, the cloud system transmits the color sample data registered in association with the job data to a reading system to which the another printing apparatus is connected, the reading system to which the another printing apparatus is connected updates the first input profile based on the first read image data and the color sample data transmitted from the cloud system to generate the second input profile, and the cloud system causes the another printing apparatus to perform printing processing using the second input profile.

In Aspect 18, the color adjustment system according to Aspect 15, wherein the cloud system further includes the display control unit that provides a terminal apparatus with information on a screen and causes the terminal apparatus to display the screen, and the information on a screen represents a job selection screen for selecting the job data from a list of job data and a print request destination selection screen for selecting print sites and a printing apparatus at each print site to be requested to print out the document file corresponding to the job data selected on the job selection screen.

In Aspect 19, the color adjustment system according to Aspect 18, wherein the color adjustment system further includes a duplication unit that duplicates first job data that is the job data selected on the job selection screen to generate second job data, the generation unit updates the input profile for the second job data using the color sample data associated with the first job data, and the print control unit causes the printing apparatus selected on the print request destination selection screen to perform printing processing for the second job data using the input profile updated by the generation unit.

In Aspect 20, a color adjustment method includes registering job data for requesting printing a document file in a storage unit, registering color sample data associated with the job data in the storage unit, causing a printing apparatus to print out the document file corresponding to the job data as a first printed matter, causing a reading apparatus to read the first printed matter to acquire first read image data, and generating an input profile based on the first read image data and the color sample data.

In Aspect 21, a color adjustment apparatus includes a print control unit that causes a printing apparatus to print out a document file corresponding to job data registered in a storage unit as a first printed matter, a reading control unit that causes a reading apparatus to read the first printed matter to acquire first read image data, and a generation unit that generates an input profile based on the first read image data and color sample data registered in the storage unit in association with the job data.

In Aspect 22, a carrier medium carrying computer readable codes for controlling a computer system to perform a method, the method includes causing a printing apparatus to print out a document file corresponding to job data registered in a storage unit as a first printed matter, causing a reading apparatus to read the first printed matter to acquire first read image data, and generating an input profile based on the first read image data and color sample data registered in the storage unit in association with the job data.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

In another aspect, a non-transitory recording medium carrying computer readable codes for controlling a computer system to perform a method. The method includes registering job data for requesting printing a document file in a memory, registering color sample data associated with the job data in the memory, causing a printing apparatus to print out the document file corresponding to the job data as a first printed matter, causing a reading apparatus to read the first printed matter to acquire first read image data, and generating an input profile based on the first read image data and the color sample data described above.

The invention claimed is:

1. A color adjustment system comprising circuitry configured to:
 register job data acquired from a client for requesting a printing company to print a document file, in a memory on a cloud system;
 register color sample data associated with the job data in the memory;
 cause a printing apparatus to print out the document file corresponding to the job data as a first printed matter;
 cause a reading apparatus to read the first printed matter to acquire first read image data;
 generate an input profile based on the first read image data and the color sample data;
 cause the reading apparatus to read a print sample to acquire print sample read image data;
 create the color sample data based on the print sample read image data;
 receive selection of a creation method of the color sample data in association with the job data which was registered; and
 create the color sample data in accordance with the creation method.

2. The color adjustment system according to claim 1, wherein the input profile is for color conversion to bring color of the first printed matter of the document file closer to color represented by the color sample data.

3. The color adjustment system according to claim 1, wherein the circuitry is configured to create the color sample data based on the document file and a color conversion rule.

4. The color adjustment system according to claim 3, wherein the circuitry is further configured to:
 receive designation of the color conversion rule in association with the job data which was registered; and
 create the color sample data based on the color conversion rule.

5. The color adjustment system according to claim 1, wherein the circuitry is further configured to:
 receive selection of a creation method that includes requesting reading of a print sample as the creation method;
 cause the reading apparatus to read the print sample to acquire the print sample read image data in a case where the creation method that includes requesting reading of the print sample has been received; and
 create the color sample data based on the print sample read image data.

6. The color adjustment system according to claim 5, wherein the reading apparatus that reads the print sample is the same as the reading apparatus that reads the first printed matter or different from the reading apparatus that reads the first printed matter.

7. The color adjustment system according to claim 1, wherein the circuitry is configured to receive designation of a reference page of the print sample to be read in response to receiving the selection of a creation method that includes reading the print sample as the creation method.

8. The color adjustment system according to claim 1, wherein the circuitry is configured to:
 cause the printing apparatus to print out the document file corresponding to the job data as the first printed matter using the input profile being a first input profile; and
 update the first input profile based on the first read image data and the color sample data to generate a second input profile as the input profile.

9. The color adjustment system according to claim 1, wherein:
 the register color sample data registers the color sample data associated with the job data in the memory which is included in the cloud system.

10. A color adjustment system comprising circuitry configured to:
 register job data acquired from a client for requesting a printing company to print a document file, in a memory on a cloud system;
 register color sample data associated with the job data in the memory;
 cause a printing apparatus to print out the document file corresponding to the job data as a first printed matter;
 cause a reading apparatus to read the first printed matter to acquire first read image data;
 generate an input profile based on the first read image data and the color sample data;

cause the printing apparatus to print out the document file corresponding to the job data using the input profile as a second printed matter;

cause the reading apparatus to read the second printed matter to acquire second read image data; and determine a color difference between the first read image data and the second read image data.

11. The color adjustment system according to claim 10, wherein the circuitry is configured to create a print report including a determination result of color difference.

12. The color adjustment system according to claim 10, wherein the circuitry is configured to cause the printing apparatus to print out a third printed matter in a case where a result of the determining of the color difference indicates that the color difference is satisfactory.

13. The color adjustment system according to claim 1, wherein the circuitry is further configured to apply the input profile to printing processing of a document file corresponding to other job data different from the job data.

14. A color adjustment system comprising circuitry configured to:

register job data acquired from a client for requesting a printing company to print a document file, in a memory on a cloud system;

register color sample data associated with the job data in the memory;

cause a printing apparatus to print out the document file corresponding to the job data as a first printed matter;

cause a reading apparatus to read the first printed matter to acquire first read image data; and generate an input profile based on the first read image data and the color sample data;

wherein:

the circuitry includes first circuitry that resides on the cloud system, the cloud system including the memory, and second circuitry that resides on a reading system, the second circuitry is configured to provide a terminal apparatus with information on a screen and cause the terminal apparatus to display the screen;

the information on the screen includes information for displaying a visual representation, the visual representation for receiving an input by an operator to cause the cloud system to control the reading system; and the second circuitry is configured to change an appearance of the visual representation to indicate that the visual representation is inoperable in a case where a bidirectional communication between the cloud system and the reading system is not established.

15. The color adjustment system according to claim 14, wherein:

in response to receiving an instruction to print by another printing apparatus, the document file corresponding to the job data and already printed by the printing apparatus, the second circuitry is configured to transmit the color sample data registered in association with the job data to a reading system to which the another printing apparatus is connected;

the reading system to which the another printing apparatus is connected includes third circuitry configured to update the first input profile based on the first read image data and the color sample data transmitted from the cloud system to generate a second input profile; and the second circuitry is configured to cause the another printing apparatus to perform printing processing using the second input profile.

16. The color adjustment system according to claim 14, wherein:

the second circuitry is configured to provide a terminal apparatus with information on a screen and cause the terminal apparatus to display the screen;

the information on a screen represents a job selection screen for selecting the job data from a list of job data and a print request destination selection screen for selecting print sites and a printing apparatus at each print site to be requested to print out the document file corresponding to the job data selected on the job selection screen; and the first circuitry is configured to:

duplicate first job data that is the job data selected on the job selection screen to generate second job data;

update the input profile for the second job data using the color sample data associated with the first job data; and cause the printing apparatus selected on the print request destination selection screen to perform printing processing for the second job data using the input profile which has been updated.

* * * * *